(12) United States Patent
Snyder

(10) Patent No.: US 10,448,213 B2
(45) Date of Patent: *Oct. 15, 2019

(54) METHODS FOR LOCATION OF PERSONS WITH ELECTRONIC WEARABLES

(71) Applicant: Alan Michael Snyder, Palo Alto, CA (US)

(72) Inventor: Alan Michael Snyder, Palo Alto, CA (US)

(73) Assignee: Alan Michael Snyder, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,493

(22) Filed: Jul. 19, 2018

(65) Prior Publication Data

US 2019/0053006 A1 Feb. 14, 2019

Related U.S. Application Data

(63) Continuation of application No. 15/096,258, filed on Apr. 11, 2016, now Pat. No. 10,057,719, which is a continuation of application No. 14/092,846, filed on Nov. 27, 2013, now Pat. No. 9,344,849.

(51) Int. Cl.
*H04W 4/02* (2018.01)
*H04W 4/029* (2018.01)

(52) U.S. Cl.
CPC .......... *H04W 4/025* (2013.01); *H04W 4/029* (2018.02)

(58) Field of Classification Search
CPC .............................. H04W 4/025; H04W 4/028

USPC ............... 701/424, 521; 340/7.27; 455/456.2
See application file for complete search history.

(56) References Cited

U.S. PATENT DOCUMENTS

| | | |
|---|---|---|
| 7,136,747 B2 | 11/2006 | Raney |
| 8,200,247 B1 | 6/2012 | Starenky et al. |
| 8,369,867 B2 | 2/2013 | Van Os et al. |
| 8,504,089 B2 | 8/2013 | Stewart |
| 9,344,849 B2 | 5/2016 | Snyder |
| 10,057,719 B2 | 8/2018 | Snyder |
| 2005/0070305 A1 | 3/2005 | Krasner et al. |
| 2006/0229058 A1 | 10/2006 | Rosenberg |
| 2007/0190494 A1 | 8/2007 | Rosenberg |
| 2007/0258382 A1 | 11/2007 | Foll et al. |

(Continued)

OTHER PUBLICATIONS

PCT/US 14/67189 Written Opinion of the International Searching Authority dated Apr. 16, 2015.

(Continued)

*Primary Examiner* — Inder P Mehra
(74) *Attorney, Agent, or Firm* — Robert Moll

(57) ABSTRACT

Methods, computer readable storage medium, and systems for mobile devices to locate persons or places are described. In a feature, the invention is a method implemented in a server for providing beaconing sequences to the mobile devices for location sharing. In a feature, the invention is a server executing a method of locating a user using a beaconing mobile device. In a feature, the invention is a non-transitory computer readable medium on a server that encodes a program to execute a method on a first mobile device that determine directions and/or distance between the first mobile device and a second mobile device. In a feature, the invention is a server executing a method to remember a place on a mobile device.

18 Claims, 25 Drawing Sheets

(56) References Cited

U.S. PATENT DOCUMENTS

| | | |
|---|---|---|
| 2008/0036653 A1 | 2/2008 | Huston |
| 2008/0079539 A1 | 4/2008 | Daley |
| 2008/0113618 A1* | 5/2008 | De Leon ............. H04M 1/7253 |
| | | 455/41.2 |
| 2008/0238768 A1 | 10/2008 | Nosworthy |
| 2009/0063236 A1* | 3/2009 | Pennay ................. G06Q 10/06 |
| | | 705/7.12 |
| 2009/0083660 A1 | 3/2009 | Lettau |
| 2009/0176451 A1 | 7/2009 | Yang et al. |
| 2009/0233629 A1 | 9/2009 | Jayanthi |
| 2010/0073201 A1 | 3/2010 | Holcomb et al. |
| 2010/0100233 A1 | 4/2010 | Lu |
| 2010/0248682 A1 | 9/2010 | Prozeniuk |
| 2011/0051665 A1 | 3/2011 | Huang |
| 2011/0053577 A1 | 3/2011 | Lee |
| 2011/0071889 A1 | 3/2011 | Erhart et al. |
| 2011/0282799 A1 | 11/2011 | Huston |
| 2011/0306366 A1* | 12/2011 | Trussel ............... H04L 63/0807 |
| | | 455/457 |
| 2012/0209685 A1 | 8/2012 | Nealer et al. |
| 2012/0252504 A1 | 10/2012 | Firstenberg et al. |
| 2012/0258741 A1* | 10/2012 | Tillson .................... G01S 3/046 |
| | | 455/457 |
| 2012/0265823 A1 | 10/2012 | Parmar et al. |
| 2013/0028612 A1 | 1/2013 | Ryan et al. |
| 2013/0059583 A1 | 3/2013 | Van Phan et al. |
| 2013/0065584 A1 | 3/2013 | Lyon et al. |
| 2013/0096813 A1 | 4/2013 | Geffner et al. |
| 2013/0132140 A1 | 5/2013 | Amin et al. |
| 2013/0134906 A1* | 5/2013 | Picariello ........... H05B 37/0245 |
| | | 315/312 |
| 2013/0178257 A1 | 7/2013 | Langseth |
| 2014/0018103 A1 | 1/2014 | Wigren et al. |
| 2014/0056172 A1 | 2/2014 | Lee |
| 2014/0148154 A1 | 5/2014 | Sonetaka |
| 2014/0155098 A1 | 6/2014 | Markham et al. |
| 2014/0213304 A1 | 7/2014 | Beckett |
| 2014/0225916 A1 | 8/2014 | Theimer et al. |
| 2014/0350840 A1 | 11/2014 | D'Argenio |
| 2015/0092676 A1 | 4/2015 | Periyalwar et al. |
| 2015/0237481 A1* | 8/2015 | Ben-Moshe ............. G01S 1/70 |
| | | 455/456.1 |
| 2015/0371273 A1 | 12/2015 | Canpolat et al. |
| 2016/0241660 A1 | 8/2016 | Nhu |
| 2019/0080353 A1* | 3/2019 | Bleecher Snyder ........................ |
| | | G06Q 30/0261 |

OTHER PUBLICATIONS

PCT/US 14/67189 International Search Report dated Apr. 16, 2015.
AppAdvice Car Finder Reviews, http://appadvice.com/appguides/show/car-finding, downloaded Feb. 5, 2014.
iPhone App in iTunes store—iFind My Car by Mobility-BR Consultoria LTDA—EPP, Oct. 16, 2013.
iPhone App in iTunes store—iReturn by Christoffer Miranda, Jan. 4, 2013.
iPhone App in iTunes store—Find Your Car with AR: Augmented Car Finder by AugmentedWorks, Dec. 2, 2013.
iPhone App in iTunes store—Find My Car by Presselite, Oct. 23, 2013.
UTC, Wearable technology, Wikipedia, Jan. 2019.
Kahn, Wear Them, Forget Them, Scientific American, Jul. 2013, p. 12.

* cited by examiner

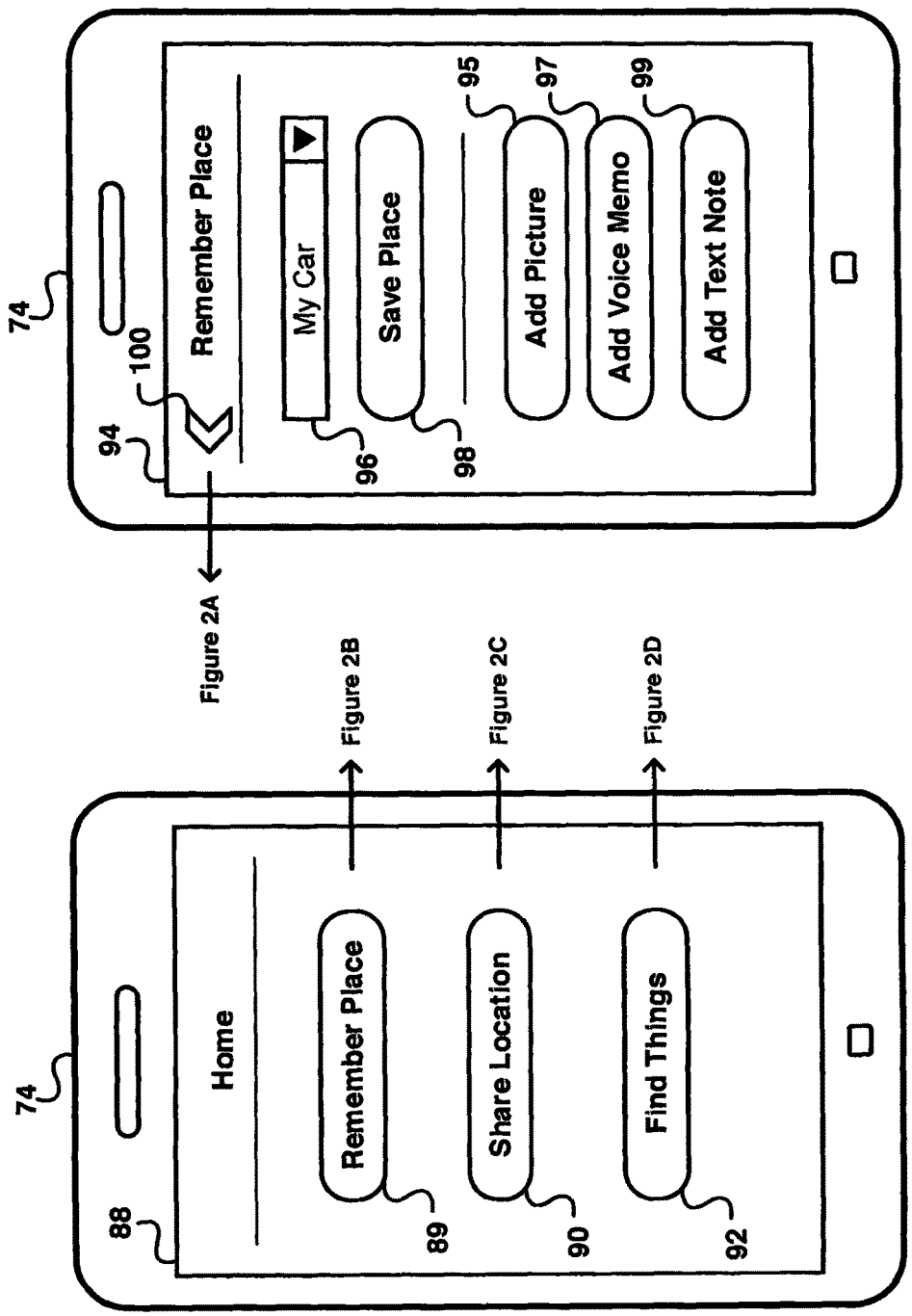

METHODS FOR LOCATION OF PERSONS WITH ELECTRONIC WEARABLES

This application is a continuation of U.S. application Ser. No. 15/096,258, which was filed on Apr. 11, 2016, which is a continuation of U.S. application Ser. No. 14/092,846, which was filed on Nov. 27, 2013, which are both incorporated by reference herein.

BACKGROUND

This invention relates to methods and systems for locating persons and places using mobile devices.

People attend events where they want to meet up with friends and acquaintances. If there is a large crowd at the event, it can be difficult for people to locate each other. Sometimes last minute changes in plans also prevent meeting up. Other times the problem is finding exactly where one parked the car after the event. Because many people carry mobile devices (e.g., cellphones), it would be useful to provide methods and systems for locating persons and places that could be implemented with mobile devices in these and other circumstances.

SUMMARY OF THE INVENTION

This invention relates to systems and methods for locating persons and place with mobile devices. In a feature, the invention is a method implemented in a server for providing beaconing sequences for location sharing to mobile devices. In a feature, the invention is a server executing a method of locating a user using a beaconing mobile device. In another feature, the invention is a non-transitory computer readable medium on a server that encodes a program to execute a method on a first mobile device that determine directions and/or distance between the first mobile device and a second mobile device. In a feature, the invention is a server executing a method to remember a place on a mobile device. In still another feature, the invention is a system for providing beaconing sequences for location sharing to mobile devices.

BRIEF DESCRIPTION OF THE DRAWINGS

FIGS. 2A-2F illustrate the user interfaces of a mobile device.

DETAILED DESCRIPTION OF PREFERRED EMBODIMENTS

The following description includes the best mode of carrying out the invention. The detailed description illustrates the principles of the invention and should not be taken in a limiting sense. The scope of the invention is determined by reference to the claims. Each part (or step) is assigned its own part (or step) number throughout the specification and drawings. Because some flow diagrams don't fit on a single drawing sheet, we use capital letters (e.g., "A") to show how the flow diagrams connect (e.g., "A" connects the flowcharts of FIGS. 18A-18D).

Figure 1:
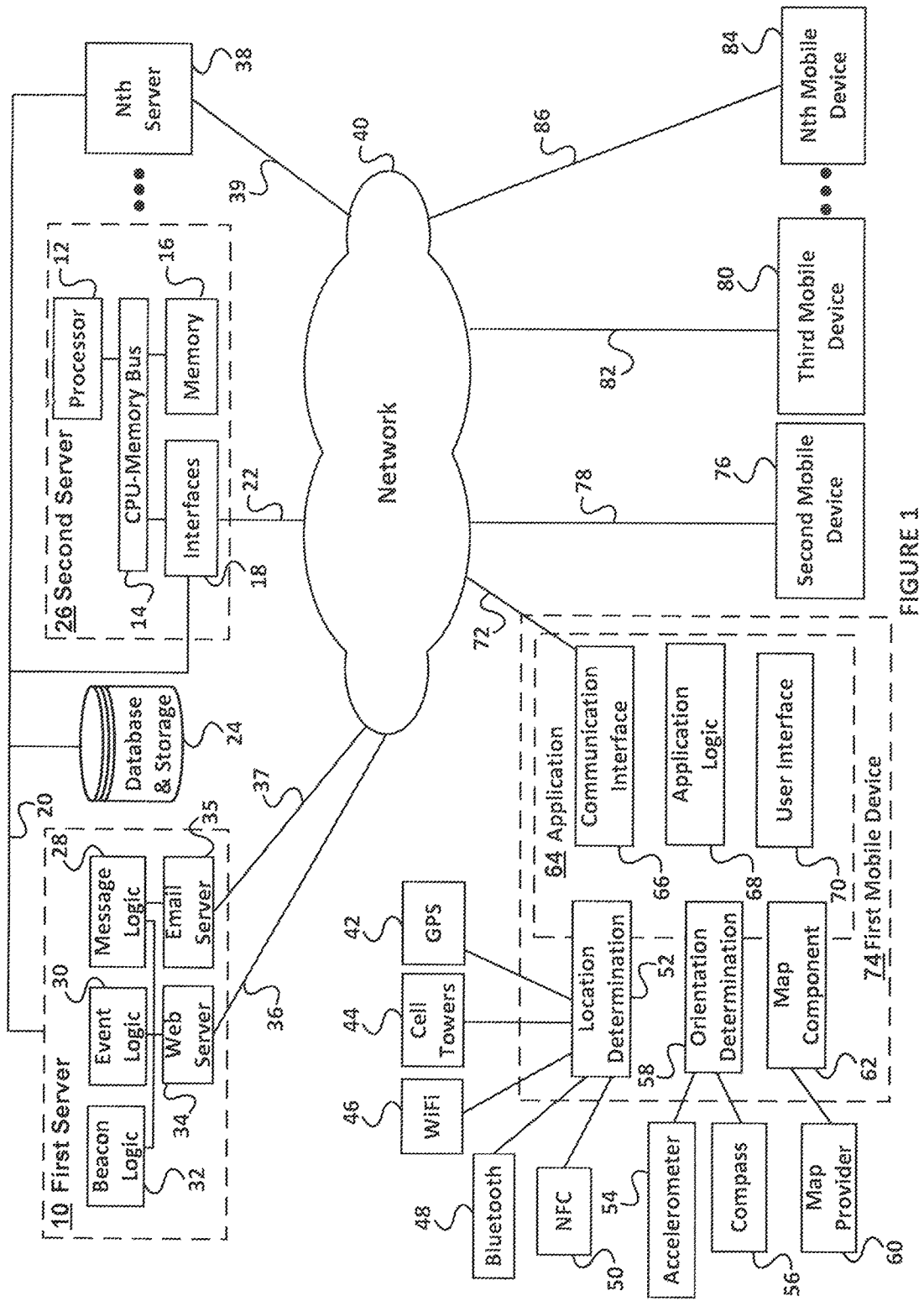
FIG. 1 is a network diagram that illustrates N mobile devices communicating with N servers.

FIG. 1 is a network diagram that illustrates N mobile devices communicating with N servers. The network diagram illustrates a system that includes the first mobile device 74, the second mobile 76, the third mobile device 80 up to the Nth mobile device 84. The communication links 72, 78, 82, and 86 connect the first mobile device 74 through Nth mobile device 84 to the computer network 40 that connects to a first server 10 through a communication link 36, a second server 26 through a communication link 22, and a Nth server 38 through a communication link 39.

We now discuss the first server 10 and the second server 26 to illustrate the software and hardware components that can be used to implement the invention.

The first server 10 illustrates the software components. The first server 10 includes a web server 34 that will listen for requests and pass them along to an email server 35, beacon logic 32 (FIG. 15), message logic 28 (FIG. 16), event logic 30 (FIG. 17) that the first server 10 executes during operation of the system. A backplane 20 links the first server 10, a database and storage 24, the second server 26, and the Nth server 38.

The second server 26 has the same software components (not shown) and illustrates hardware for the first server 10 through Nth server 38. It includes a CPU-memory bus 14 that communicates with a processor 12. The second server 26 includes memory 16 coupled to the processor 12 and interfaces 18 that connect through a communication link 22 to the network 40.

Data is defined as including user data, instructions, and metadata. Inputting data is defined as the input of parameters and data from user input, computer memory, and/or storage device(s).

A processor could be any suitable general purpose processor running software. For example, the processor could be one or more multicore processors made by Intel or licensed by ARM, and AMD. In another example, we could use a low cost single board computer processor such as Raspberry Pi. The arrangement and type of the processors is not essential to the invention.

Hennessy and Patterson, *Computer Architecture: A Quantitative Approach* (2006), and Patterson and Hennessy, *Computer organization and Design: The Hardware/Software Interface* (2007) describe computer hardware and software, storage systems, and networks and are incorporated by reference.

Each server may run an operating system such as Linux, UNIX, a Windows OS, or another suitable operating system. Tanenbaum, *Modern Operating Systems* (2008) describes operating systems in detail and is hereby incorporated by reference. Bovet and Cesati, *Understanding the Linux Kernel* (2005), and Bach, *Design of the Unix Operating System* (1986) describe operating systems in detail and are incorporated by reference herein.

In an embodiment, each server could be implemented on a virtual machine hosted by VMware, Hyper V, or open source software Xen. Lowe et al. *Mastering VMware vSphere* 5.5 (2013) describes the VMware virtualization software in detail and is incorporated by reference herein. Matthews et al., *Running Xen: A Hands-On Guide to the Art of Virtualization* (2008) describes the free open source Xen virtualization software in detail and is incorporated by reference herein.

In a typical environment, the server will be implemented by hundreds even thousands of computers in a data center such as Amazon Web Services, Google Compute Engine, Microsoft Azure, or Rackspace. It is not essential to the invention that a particular data center be used. Murty, *Programming Amazon Web Services: S3, EC2, SQS, FPS, and SimpleDB* (2008) describes the Amazon Web Services in detail and is incorporated by reference herein. Sanderson, *Programming Google App Engine* (2012) describes the Google App Engine in detail and is incorporated by reference herein.

In an alternative embodiment, the server will be implemented using low cost single board computers such as Raspberry Pi that runs locally in the geographic area and/or near the mobile devices and communicates with the mobile devices using, for example, network protocols such as Bluetooth (e.g., low energy Bluetooth), Wi-Fi, or TCP/IP. Halfacree, *Raspberry Pi User Guide* (2012) describes this single board computer in detail and is incorporated by reference herein.

The database and storage 24 stores the user and event information and communicates with the first server 10, the second server 26, and the Nth server 38. A non-transitory computer-readable medium (e.g., storage device, DVD, USB storage device) can be used to encode the software program instructions described in the methods below. Rockoff, *The Language of SQL: How to Access Data in Relational Databases* (2010) describe SQL databases in detail and is incorporated by reference herein. Redmond et al., *Seven Databases in Seven Weeks* (2012) describe non-SQL databases in detail and is incorporated by reference herein.

A first mobile device 74 (e.g., a cell phone, a tablet, a smart watch, electronic wearable clothing, or glasses) includes an application 64, including a communication interface 66, application logic 68, and a user interface 70.

The communication interface 66 includes a conventional network interface that enables the first mobile device 74 to communicate through a link 72 to a computer network 40, which includes the cellular phone network (e.g. AT&T, Verizon, Sprint, NTT DoCoMo, Orange, and China Mobile) and/or the Internet. Tanenbaum, *Computer Networks* (2010) describes computer networks in detail and is incorporated by reference herein.

The user interface 70 defines a set of graphical user interfaces that will be displayed on the screen of the mobile device 74 as shown in FIGS. 2A-2F.

The application logic 68 defines the state of the application (e.g., what screen is being displayed and the mobile device beacon state), stores inputs such as locations of mobile devices obtained from the servers of the computer network 40, and calculates the relative distances and directions of the mobile devices.

The application logic 68 can be written in a variety of languages. For example, if the mobile device is an Apple device the language would be Objective-C. Kochan, *Programming in Objective-C* (5th Edition)(Developer's Library)(2012) describes Objective-C in detail and is incorporated by reference herein. For example, if the mobile device is Android device the language could be Java. Medinieks, *Programming Android: Java Programming for the New Generation of Mobile Devices* (2012) describes Android programming in detail and is incorporated by reference herein.

The first mobile device 74 has a location determination component 52 that determines the location of the first mobile device 74 by using a variety of sources. For example, a global positioning system (GPS) 42 and cell tower 44 are suitable as long range sources. For shorter range location determination, Wi-Fi 46, Bluetooth 48, including Bluetooth low energy (LE), and a RFID protocol such as near field communication (NFC) 50 are suitable. Tanenbaum, *Computer Networks* (2010) describes these protocols in detail and is incorporated by reference herein.

The first mobile device 74 has an orientation determination component 58 that determines the orientation of the first mobile device 74 with respect to magnetic north and with respect to the earth's surface by using a variety of sources. For example, many mobile devices contain an accelerometer 54 and a compass 56 and gyroscopes (not shown) which function as suitable sources of orientation.

The first mobile device 74 optionally has a map component 62 that enables the first mobile device 74 to communicate over the Internet with a map provider such as Google maps, Apple maps, Nokia's HERE maps, and OpenStreetMap. It is not essential to the invention which map provider is used.

FIGS. 2A-2F illustrate the details of the user interfaces of a mobile device.

FIG. 2A illustrates the first mobile device 74 includes a home screen 88 that displays a set of user selectable buttons: a remember place button 89, a share location button 90, and a find things button 92.

To illustrate the remember place feature, assume a first user named Alan is using the first mobile device 74 to find his car in a parking lot. If Alan selects the remember place button 89, the application logic 68 uses the user interface 70 of the first mobile device 74 to display a remember place screen 94 shown in FIG. 2B.

As shown in FIG. 2B, the screen 94 displays a field 96 that contains the name of the item whose location a user wants to remember. For example, the field 96 is a drop down menu that holds a value for Alan's car: "My Car" that is associated with location information in the parking lot.

To increase the types of items that can be identified, the field 96 can be an input field for names entered by the user. After entering the value either by menu or text field, the user can save that value by clicking on a save place button 98.

The user can tag the item with other information beside or in lieu of the location information by selecting the "add picture" button 95, the "add voice memo" button 97, and/or the "add text note" button 99, which will call up respectively, the camera, voice memo, and/or text feature of the first mobile device 74. Thus, for Alan to find the place of an item (e.g., where he parked his car or bike, where he left a package, or his favorite store or restaurant) he can use the remember place feature to store coordinates and/or other location related information.

Referring to FIG. 2A, if Alan wants to share his location with others at an event such as a concert, he will select the share location button 90 of the home screen. Now the application logic 68 of the first mobile device 74 will display the share location screen 102 on the first mobile device 74 as shown in FIG. 2C.

Figure 2D:
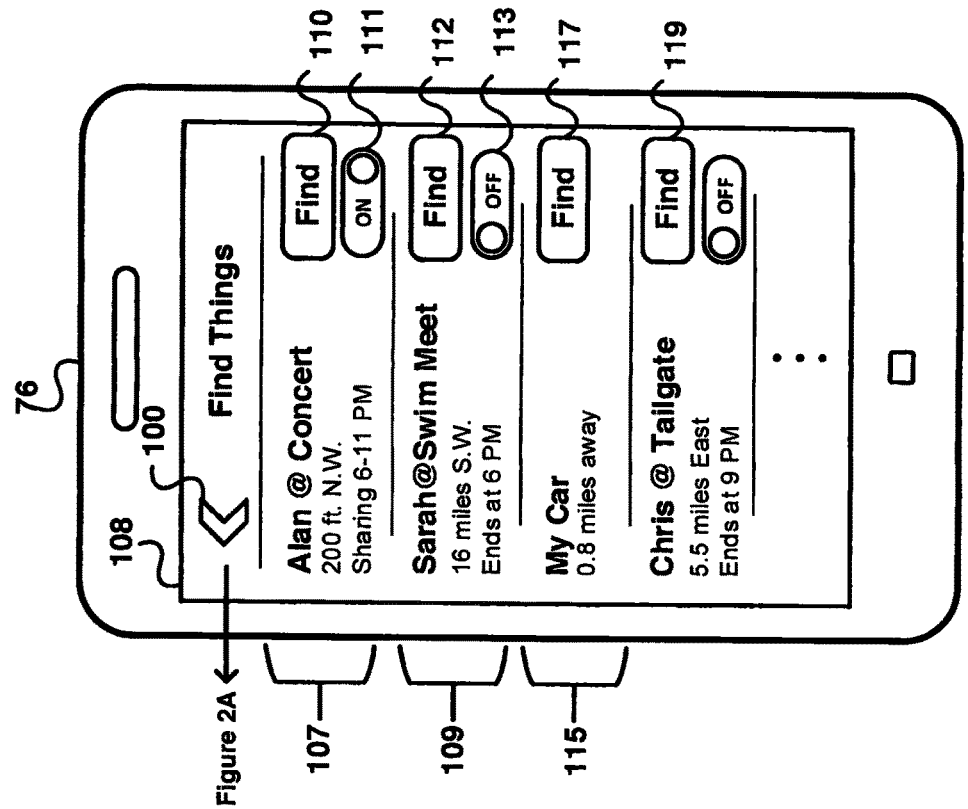
Figure 2C:
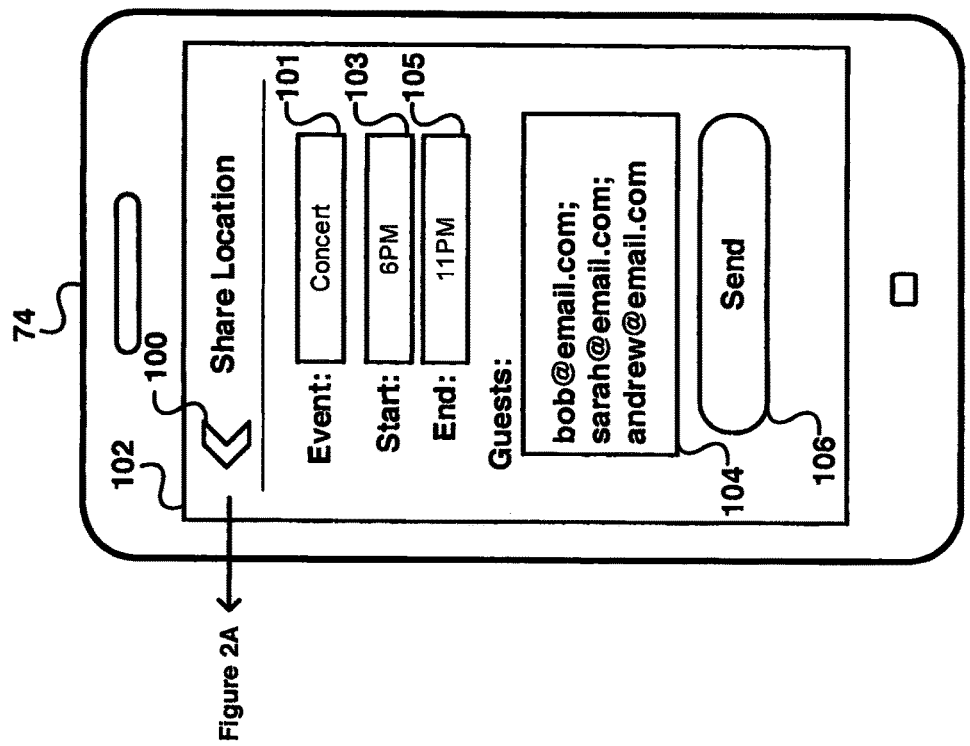

As shown in FIG. 2C, Alan wants to share his location from 6-11 PM with Bob, Sarah, and Andrew at an event such as a concert. Alan adds values in the input fields such as "Concert" in the event field 101, "6 PM" in the start time field 103, "11 PM" in the end time field 105, and the email addresses of Bob, Sarah, and Andrew in a guest field 104. Alan will then press the send button 106. The email addresses can be retrieved from the contact list of the first mobile device 74 or from Internet contact lists, e.g., LinkedIn, Facebook, and Yahoo contacts. On pressing the send button 106, the application logic 68 will use the communication interface 66 to send a message to the first server 10 (FIG. 1) that will in turn send a message to a second mobile device 76.

Let's now assume a second user "Bob" uses the second mobile device 76 that receives the message. Bob will see a new entry "Alan @ Concert" on the list of the find things screen 108 as shown in FIG. 2D. Before 6 PM, the entry appears, but no distance will be indicated, because the time for location sharing has not begun. However, at 6 PM, the find things screen 108 will add Alan's current distance and direction from Bob, e.g., Alan is 200 feet NW of Bob. The distance and direction updates periodically to track the locations of the first and second mobile devices 74, 76. At 11 PM, the Alan @ Concert entry 107 may be deleted from second mobile device 76 since the time of location sharing is over.

The find things screen 108 optionally includes an on-off slider 111 to make the second mobile device 76 visible to the first mobile device 74, or make it visible to other mobile devices on the guest list, or invisible to everybody.

Figure 2F:
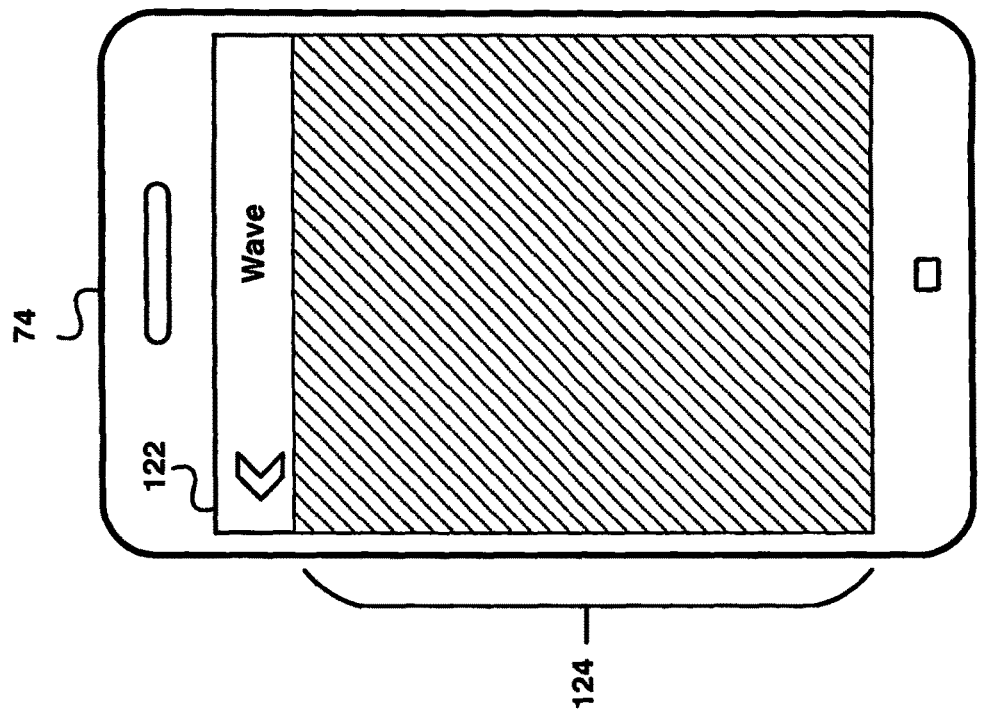
Figure 2E:
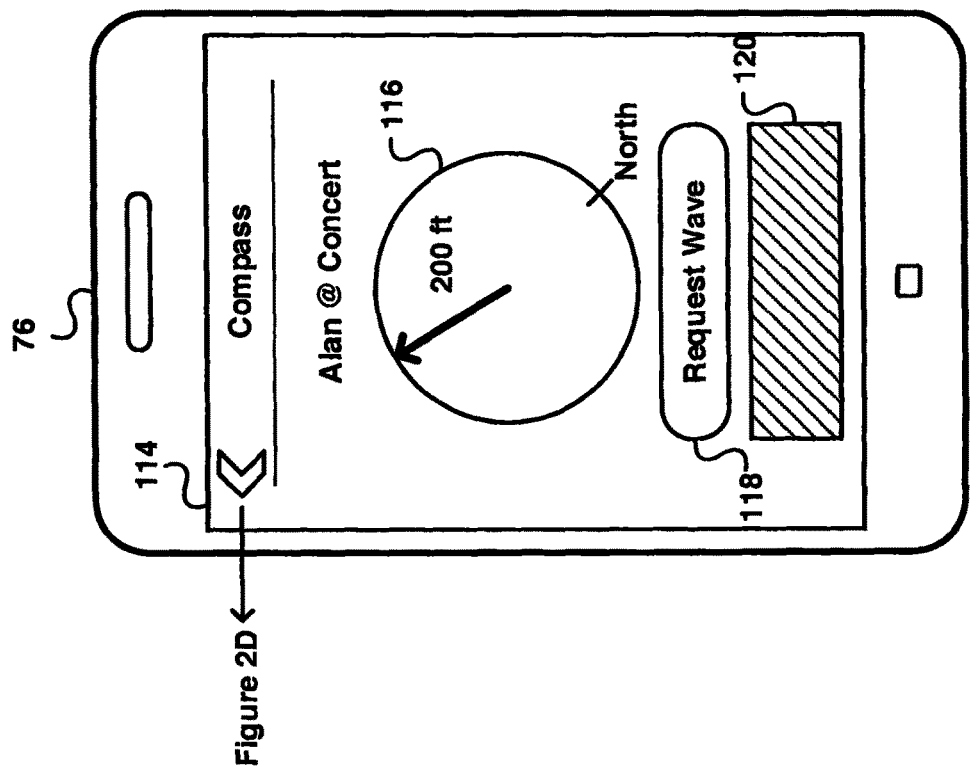

FIG. 2E illustrates the display screen 114 of the second mobile device 76 includes a compass 116, a user selectable request to wave button 118, and a beacon indicator 120. As shown, the compass 116 displays that the first user Alan is at an event Concert, 200 feet away in the direction of the compass arrow. Optionally, the compass 116 may indicate north of NWSE directions.

FIG. 2F illustrates the display screen 122 of the first mobile device 74 includes a beaconing display 124 that will be used to find the first user, Alan as will be described in detail in FIGS. 3-8.

Figure 3:
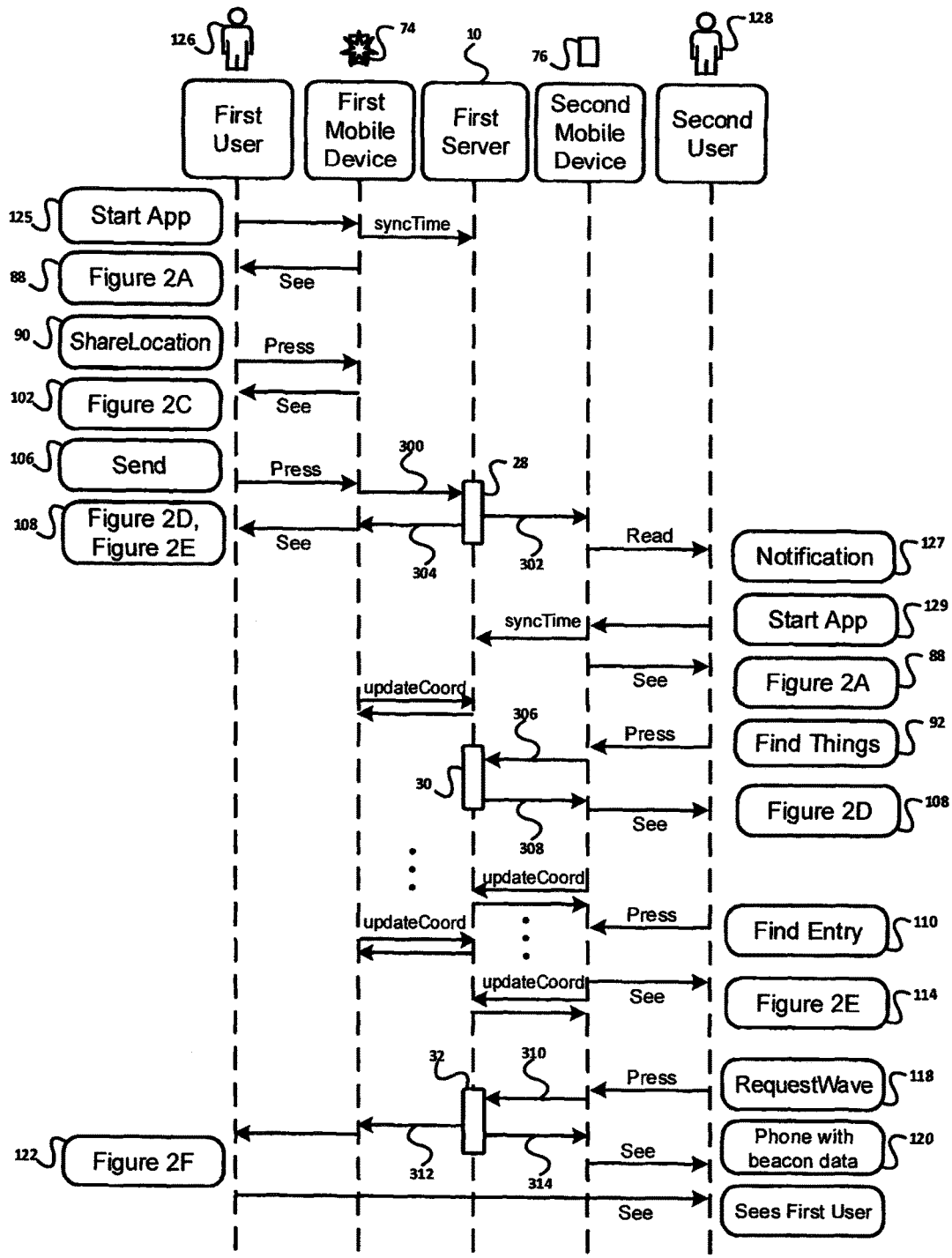
FIG. 3 illustrates user interactions and communications among the mobile devices and the servers.

FIG. 3 illustrates interactions and communications among the mobile devices and a server. Initially, the first user 126 (e.g., Alan) of the first mobile device 74 will press a button Start App 125 that will send a HTTP request to compare the clock of the first mobile device 74 with the clock of the first server 10. That time difference will be stored in the memory of the first server 10, which will be used by the application later. The first mobile device 74 will display the home screen 88 as shown in FIG. 2A. The first user 126 will press the share location button 90. The first mobile device 74 will display the screen 102 as shown in FIG. 2C. The first user 126 will complete the fields 101, 103, 104, and 105 and press the send button 106 as illustrated in FIG. 2C. The first mobile device 74 sends a message 300 to the message logic 28 (FIGS. 1 and 16) of the first server 10, which will send a notification message 302 to the second mobile device 76 to notify the second user 128 (e.g., Bob) that a new item 107 (e.g., Alan @ Concert) was added to the find things screen 108 of the second mobile device 76. The first server 10 also sends a response 304 to the request 300 to confirm the notification 127 (e.g., email, text, or push notification) regarding the event (e.g., Concert) was sent to each guest on the guests list 104.

Next, the second user 128 (e.g., Bob) of the second mobile device 76 will start the app 129 that will send a HTTP request to compare the clock of the second mobile device 76 with the clock of the first server 10. That time difference will be stored in the memory of the first server 10, which will be used by the application later. The second mobile device 76 will display the home screen 88 as shown in FIG. 2A. The second user 128 will press the find things button 92. The second mobile device 76 will send a request 306 to the event logic 30 (FIGS. 1 and 17) of the first server 10. The first server 10 reads the entries 107, 109, and 115 of the find things list in the database 24 (FIG. 1) and sends a response 308 to the second mobile device 76. The response 308 includes a list of the entries as illustrated in the find things screen 108 of the second mobile device 76 as shown in FIG. 2D.

The first and second mobile devices 74, 76, as well as the other mobile devices, periodically update their coordinates to the first server 10 that keeps track of their respective locations.

Figure 15:
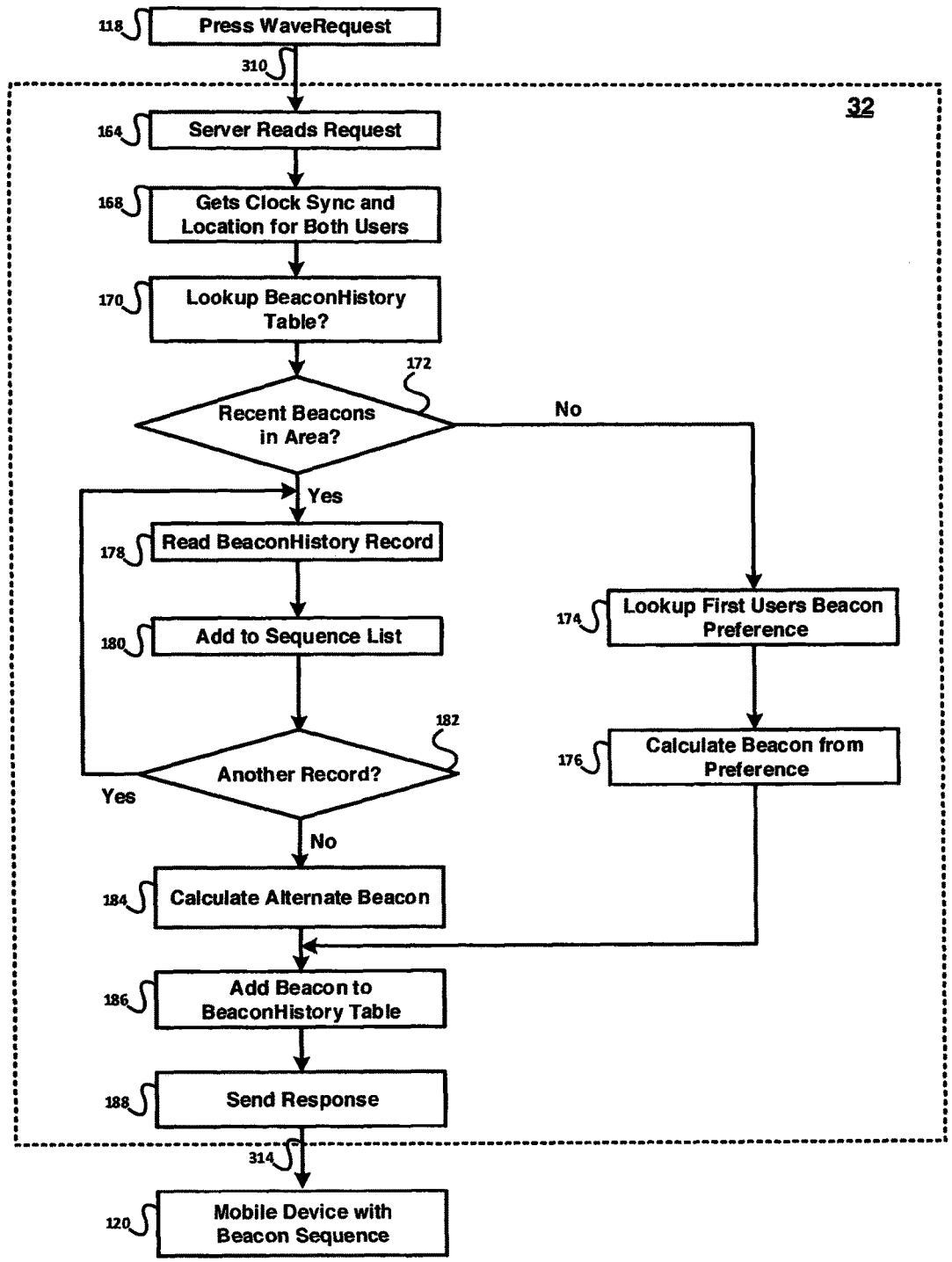
FIG. 15 illustrates a flow diagram for the beaconing logic that runs on the server of FIGS. 1 and 3.

The second user 128 of the second mobile device 76 will press the find button 110. The second mobile device 76 will display the compass screen 114 as shown in FIG. 2E. The second user 128 of the second mobile device 76 will then press the request wave button 118. The second mobile device 76 will send a request 310 to the beacon logic 32 (FIGS. 1 and 15) of the first server 10. The first server 10 will read a list of users in the geographic area of interest and each of their beaconing sequences to identify what beaconing sequence is available for assignment as illustrated in FIG. 15. The first server 10 sends a message 312 with the assigned beaconing sequence 142 (FIG. 9) to the wave screen 122 of the first mobile device 74 as illustrated in FIG. 2F. Referring to FIG. 3, the first server 10 sends a response 314 with the assigned beaconing sequence 144 (FIG. 9) to the second mobile device 76. A request to wave will trigger a beacon sequence on another mobile device so it is conspicuous and can be seen.

The second user 128 (e.g., Bob) now uses the compass 116 to get the distance (e.g., 200 feet) and direction of the first user 126 (e.g., Alan). In addition, the second user 128 can use the beaconing sequence 144 on the beaconing indicator 120 of his second mobile device 76 to indicate the beaconing sequence 142 being displayed on the first mobile device 74. Now the second user 128 will be able to spot the first user 126 as long as the first mobile device 74 is visible to the second user 128.

Figure 4:
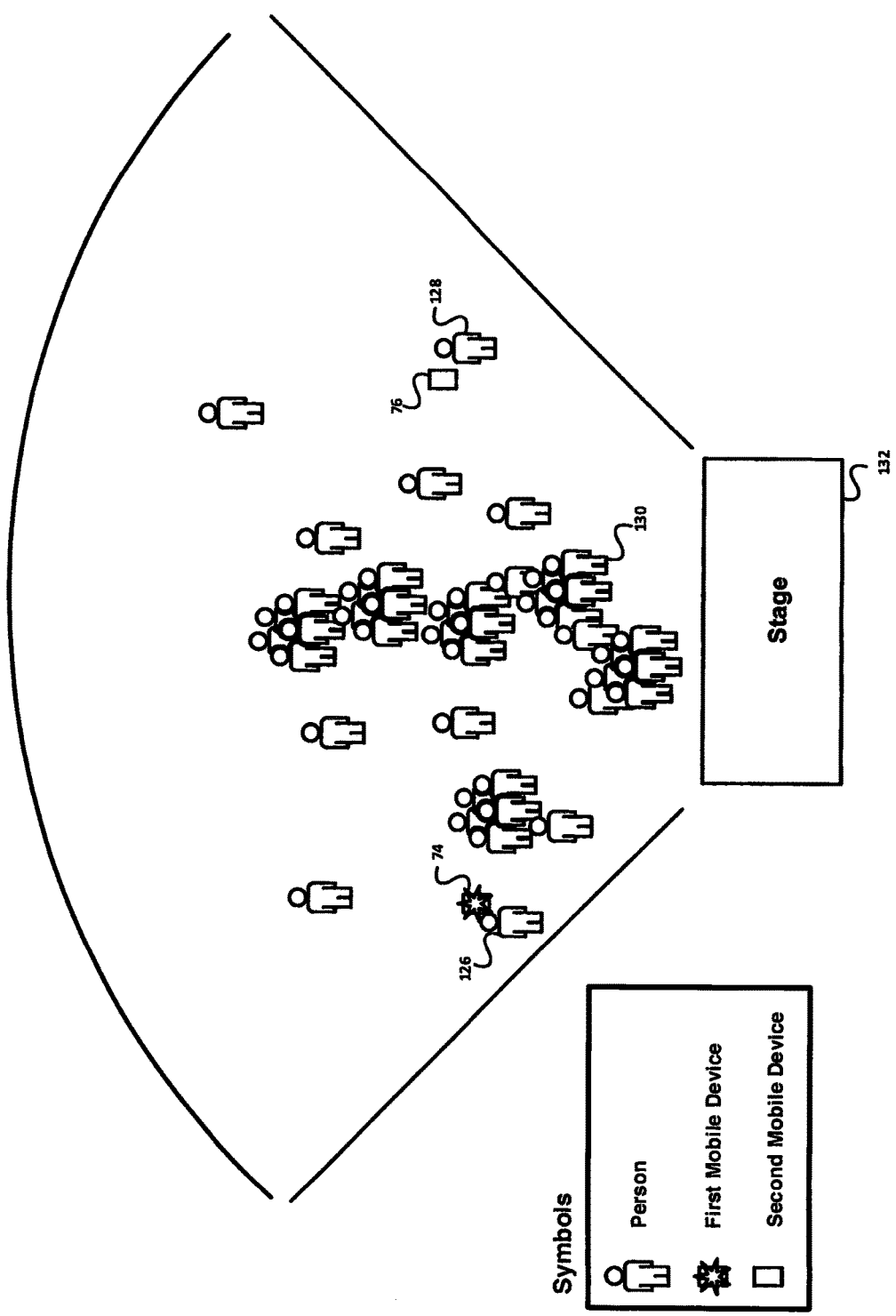
FIG. 4 illustrates a second mobile device user locating a first mobile device user in a crowd using the compass feature.

FIG. 4 illustrates a crowd gathered at an event such as concert with a stage 132. Let's assume the crowd 130 prevents or makes it difficult for a first user 126 (e.g., Alan) and the second user 128 (e.g., Bob) to locate each other. The first mobile device 74 held by the first user 126 beacons which is seen by the second user 128 holding the second mobile device 76.

Figure 5:
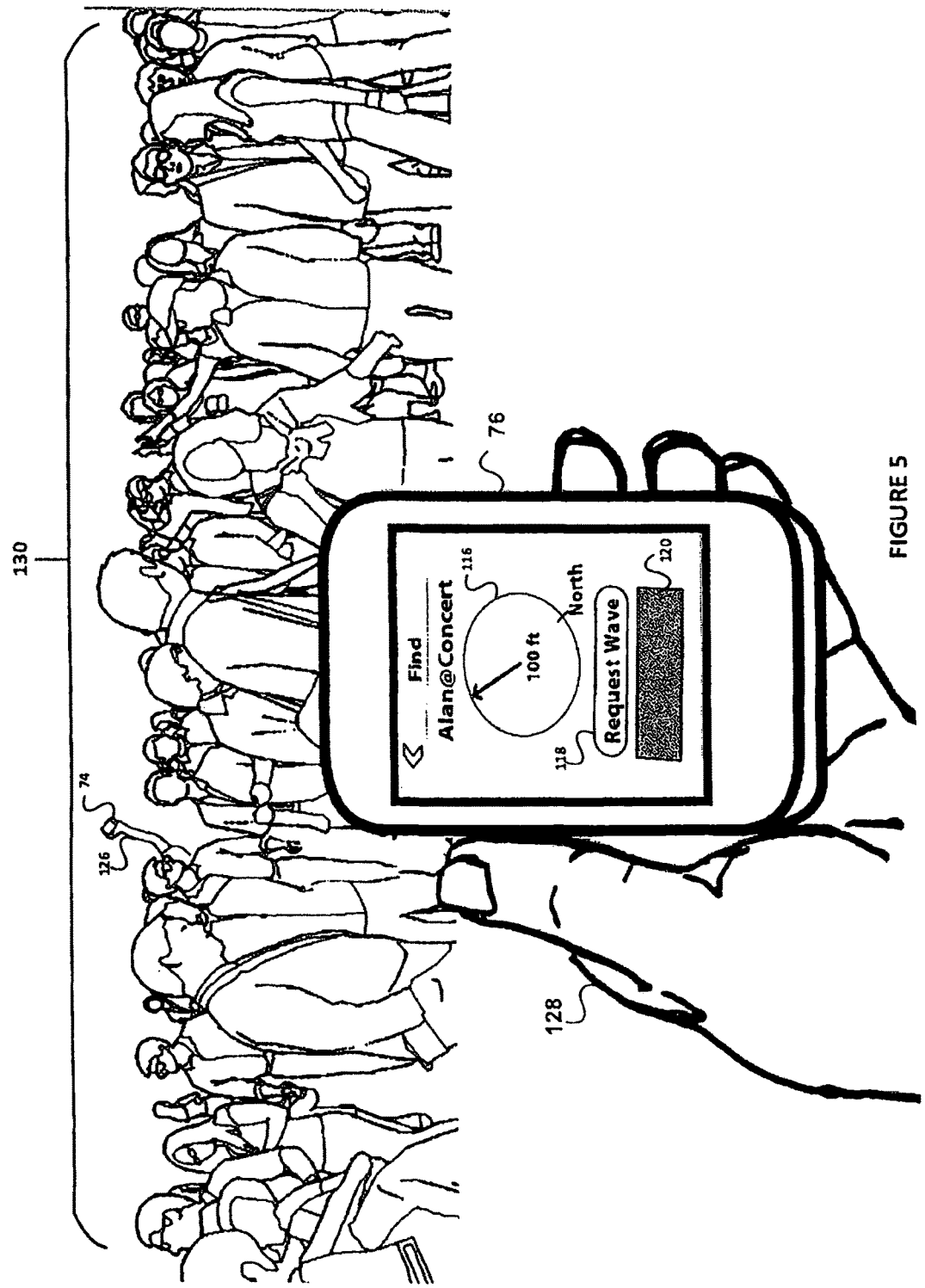
FIG. 5 is a perspective view of a second mobile device user locating a first mobile device user in a crowd using a compass.

FIG. 5 is a perspective view of FIG. 4 that illustrates how the first user is found by the second user. The first user 126 holds the beaconing first mobile device 74 (e.g., cell phone) apart from the crowd. The second user 128 holds a second mobile device 76 (e.g., cell phone) displaying a compass 116 that points to the first user 126 and includes a request to wave button 118 that was pressed to trigger beaconing on the first mobile device 74 and a beacon indicator 120.

Figure 6:
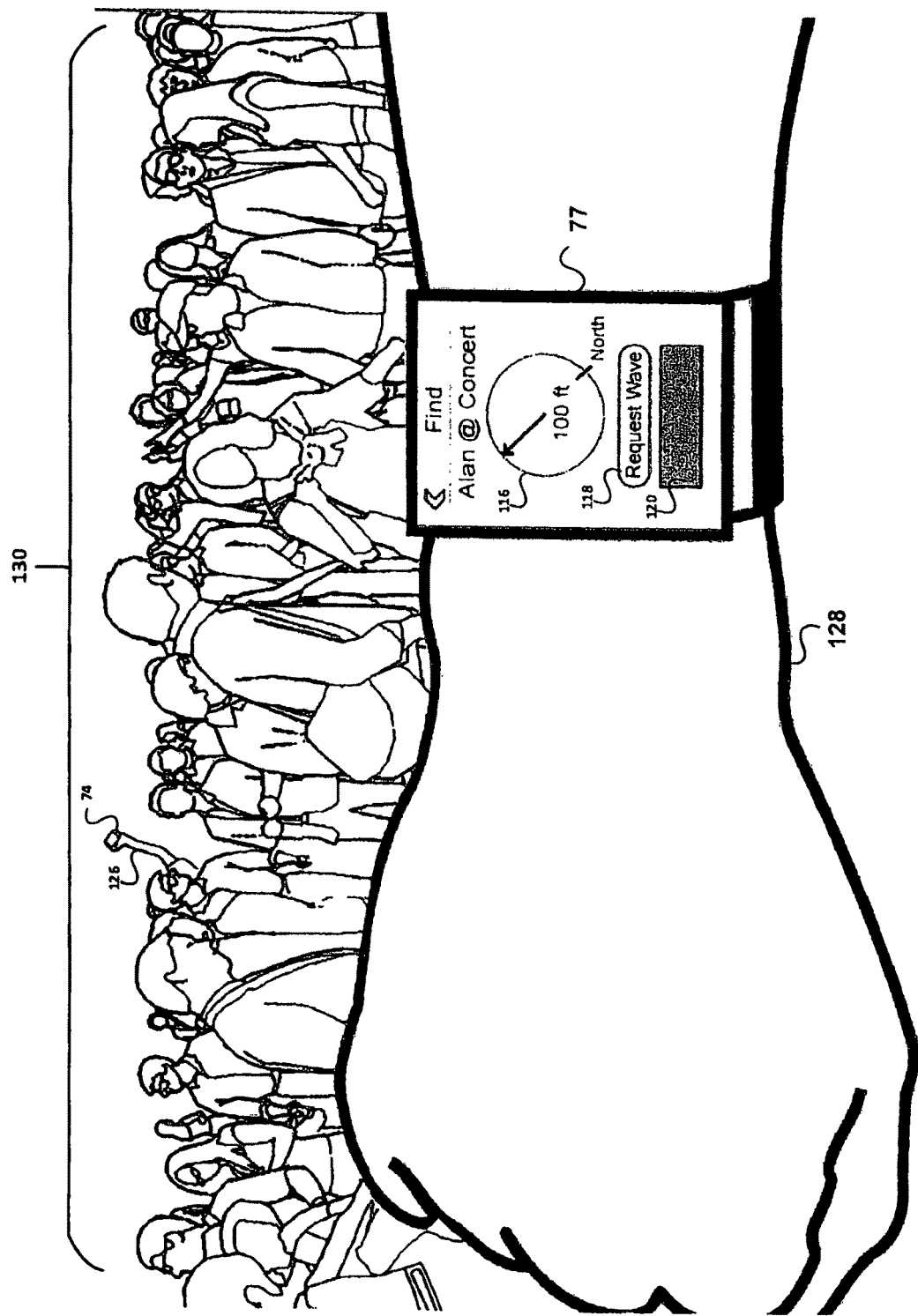
FIG. 6 is a perspective view of a second mobile device user locating a first mobile device user in a crowd using the compass on a smart watch or an electronic wearable.

FIG. 6 is a perspective view of FIG. 4 that illustrates another context where a first user is found by a second user. The first user 126 holds the beaconing first mobile device 74 (e.g., a cell phone or tablet) apart from the crowd. The second user 128 holds or wears a second mobile device 77 (e.g., smart watch/electronic wearable) displaying a compass 116 that points to the first user 126 and includes a request to wave button 118 that was pressed to trigger beaconing on the first mobile device 74 and a beacon indicator 120.

Figure 7:
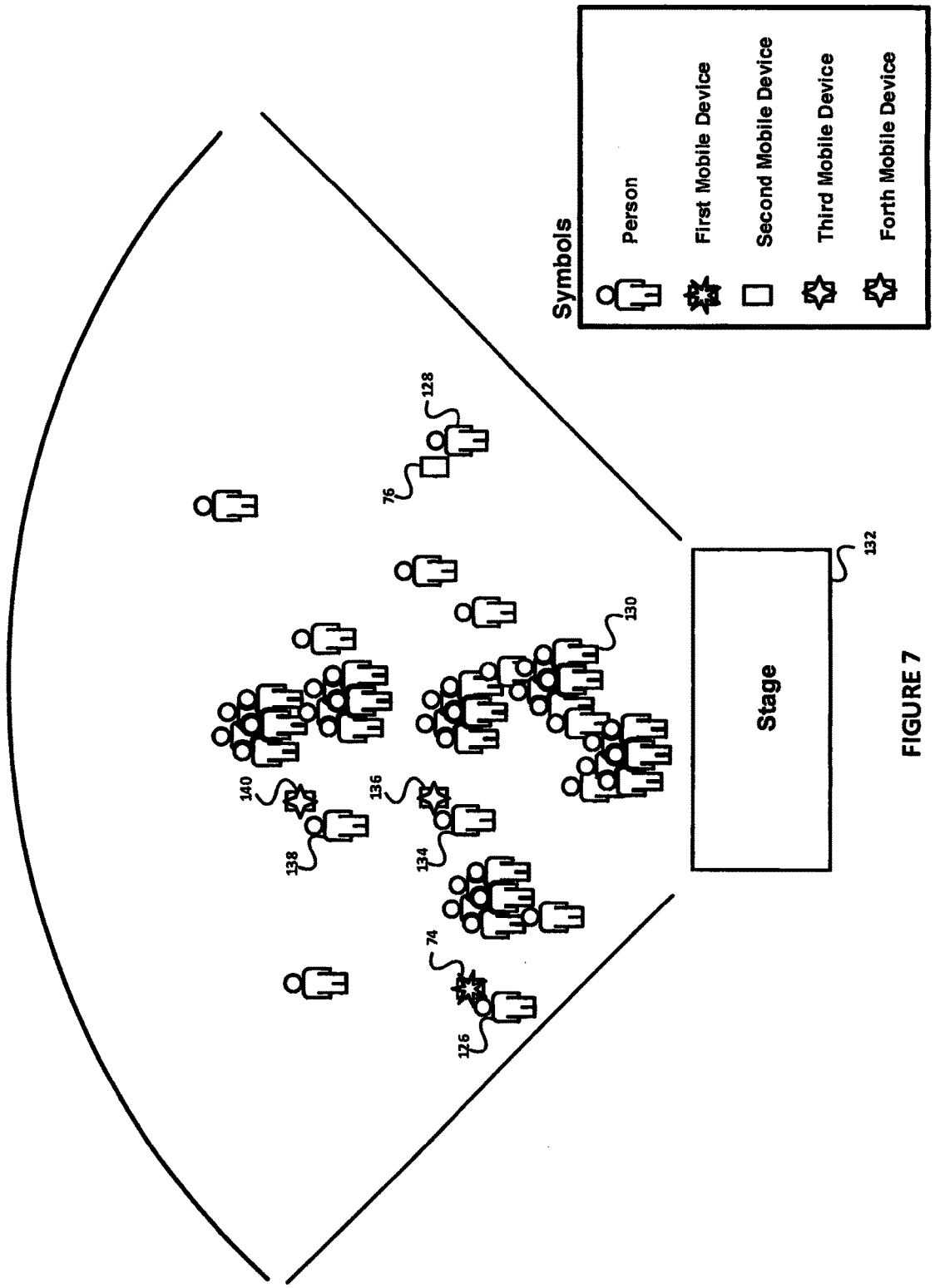
FIG. 7 illustrates a second mobile device user locating a first mobile device user by using a beaconing mobile device in a crowd with other users.

FIG. 7 illustrates a crowd gathered at an event such as concert with a stage 132. Let's assume the crowd 130 prevents or makes it difficult for a first user 126 (e.g., Alan) and the second user 128 (e.g., Bob) to locate each other. In addition, unrelated persons at the event are using our method of location. Thus, the first user 126 is holding a first mobile device 74, a third user 134 is holding a third mobile device 136, and a fourth user 138 is holding a fourth mobile device 140, which are all beaconing.

Figure 8:
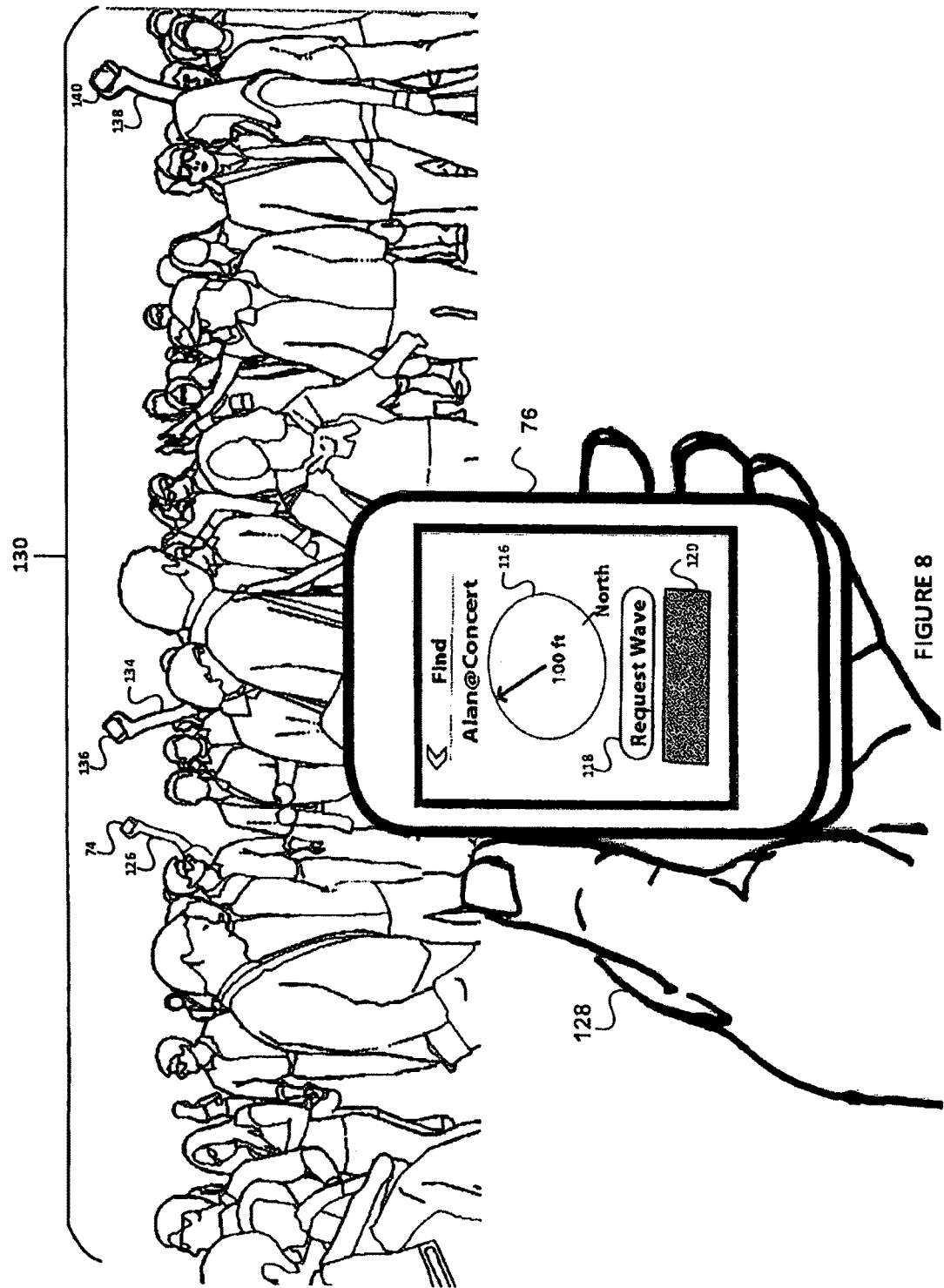
FIG. 8 is a perspective view of a second mobile device user locating a first mobile device user in a crowd by using the beaconing mobile device.

FIG. 8 is a perspective view of FIG. 7 that illustrates how our method would enable the second user to find the first user despite the presence of other beaconing mobile devices. The first user 126 holds the beaconing first mobile device 74 (e.g., cell phone) apart from the crowd 130. The second user 128 holds a second mobile device 76 (e.g., cell phone) displaying a compass 116 that points to the first user 126 and includes a request to wave button 118 that was pressed to trigger beaconing on the first mobile device 74 and a beacon indicator 120. This time, however, the third user 134 is near the first user 126. The compass 116 is no longer sufficient to locate the first user 126, because it points generally toward the first user 126 and the third user 134. This is one situation where assigning a unique beaconing sequence can help locate the first user 126.

Figure 9:
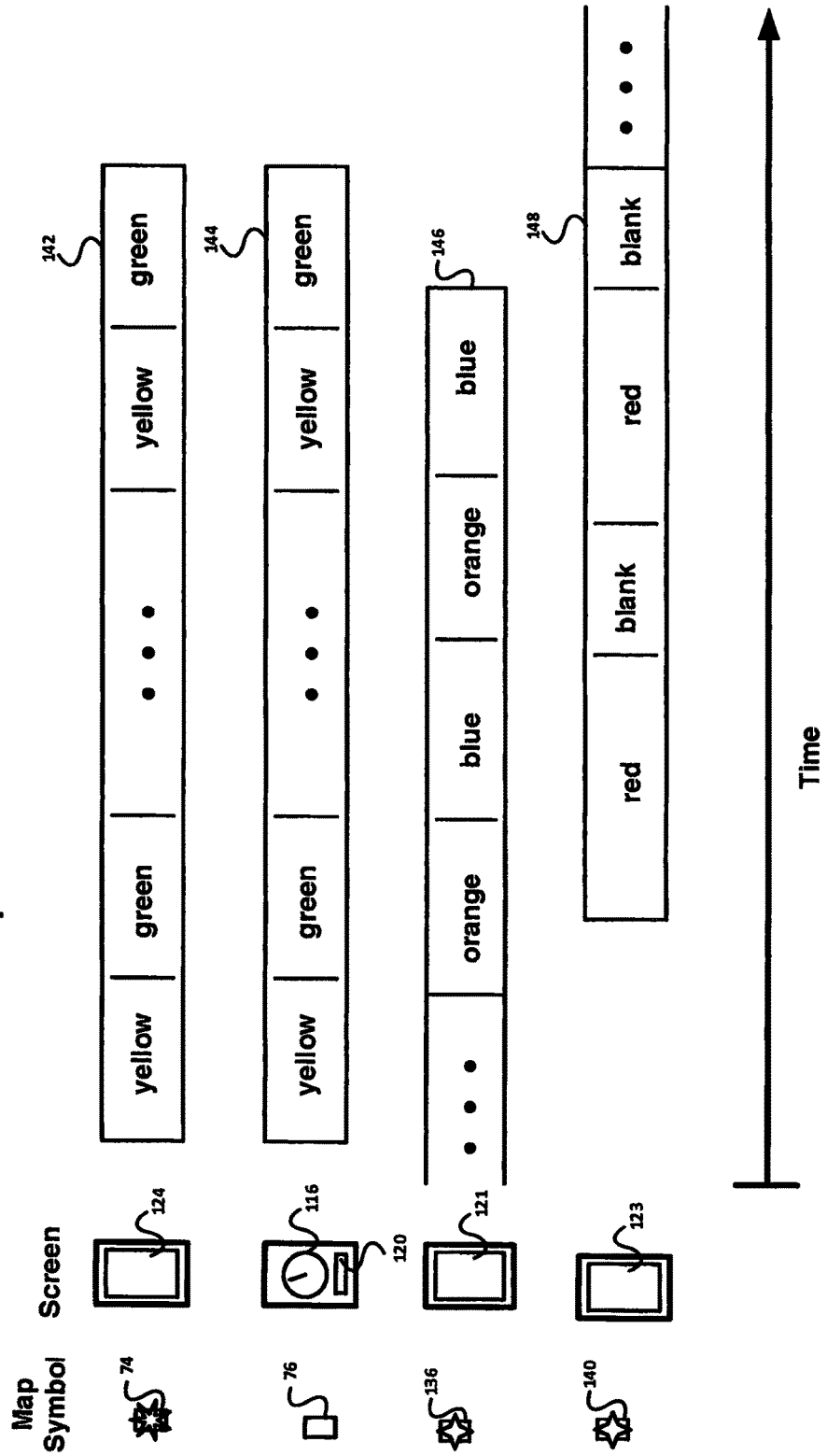
FIG. 9 illustrates beaconing sequences used in FIGS. 7-8.

FIG. 9 illustrates a beaconing sequence that can be flashed to locate a person in the crowd as shown in FIGS. 7-8. The first mobile device 74 includes a screen 124 that flashes a yellow green beaconing sequence 142. The second mobile device 76 includes a beaconing indicator 120 that flashes the yellow green beaconing sequence 144. The third mobile device 136 includes a screen 121 that flashes an orange blue sequence 146. A fourth user 138 holding a fourth mobile device 140 is flashing a red off beaconing sequence 148

The compass 116 can eliminate the fourth user 138 from consideration, because it points away from the fourth mobile device 140 as shown in FIG. 8. However, the compass 116 points toward the first mobile device 74 and the third mobile device 136. The second user 128 can distinguish the first user 126 from the third user 134, however, because the orange blue beaconing sequence 146 contrasts with the yellow green beaconing sequence 144 on the beaconing indicator 120. The beaconing sequences 142, 144 can be synchronized to assure the second user 128 that it is the first user 126.

Figure 10:
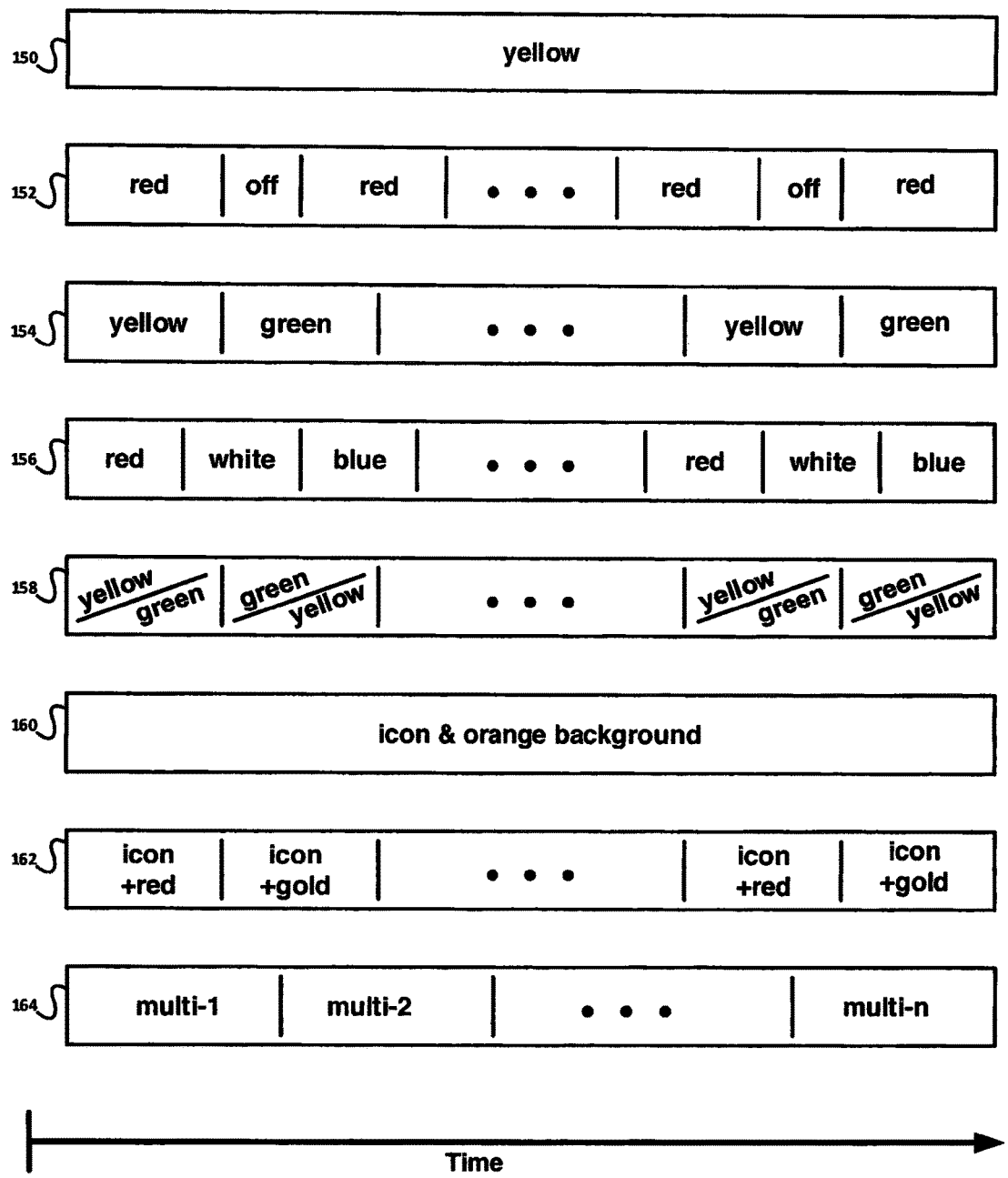
FIG. 10 illustrates a variety of beaconing sequences.

FIG. 10 illustrates a variety of beaconing sequences which can be assigned to a given mobile device by the first server 10. As shown, a beaconing sequence is a combination of colors, timing, icons and text delivered in segments that will enable a user to locate another user of interest in a crowd. For example, the beaconing sequence could simply be a single color such as yellow 150 that is displayed. To increase visibility, the beaconing sequence could be a flashing color such as red 152, multiple alternating colors such as yellow-green-yellow 154, or multiple colors in a repeating sequence of segments such as red, white, and blue 156. Further, the beaconing sequence can be multiple colors displayed at the same time such a segment of yellow/green 158, or an icon (static or dynamic) on a background color(s) such orange 160, or an icon on alternating background colors such as red and gold 162, or a non-repeating sequence of multiple colors 164.

Figure 11:
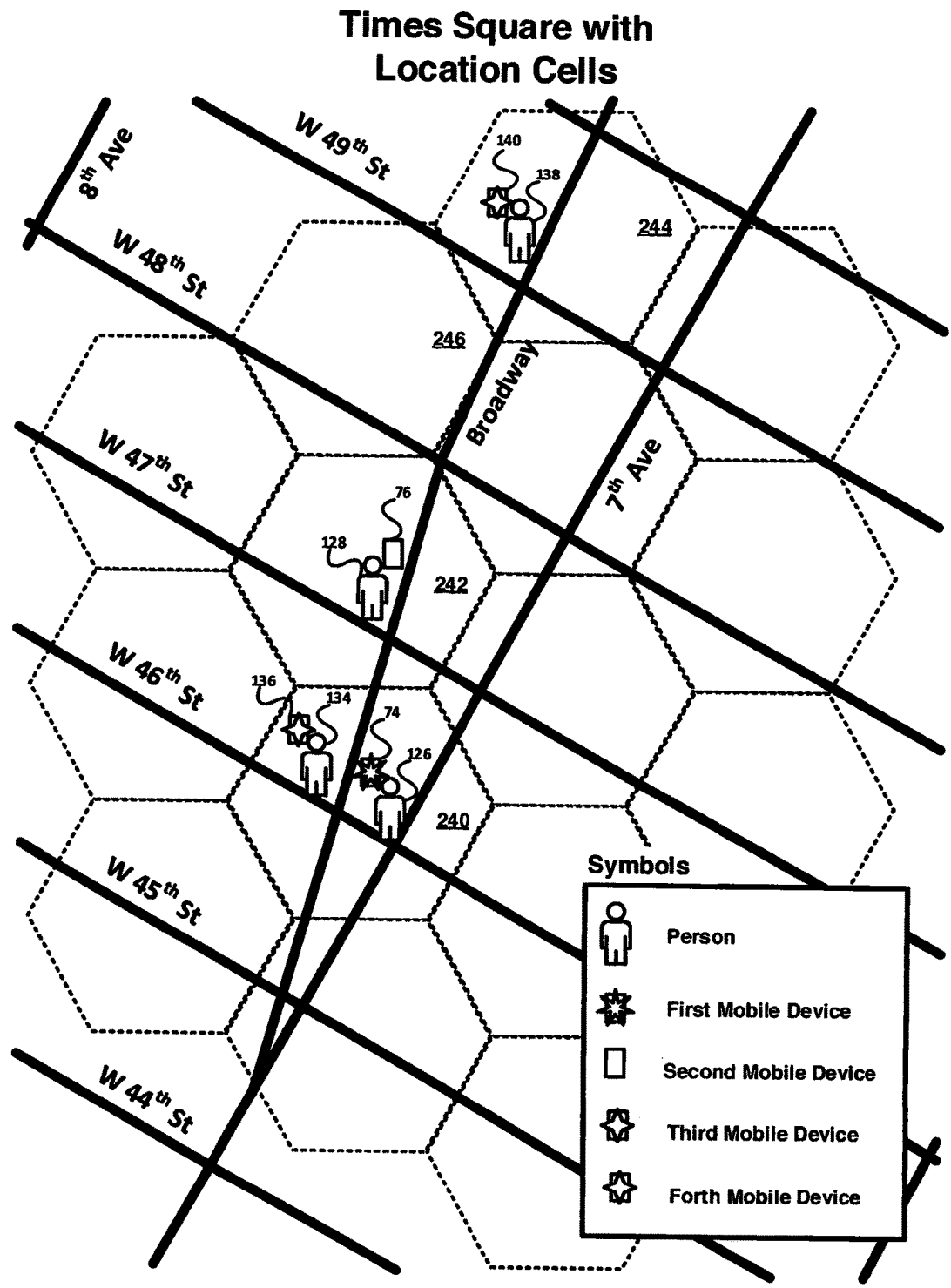
FIG. 11 illustrates assigning beaconing sequences by location cells.
Figure 12:
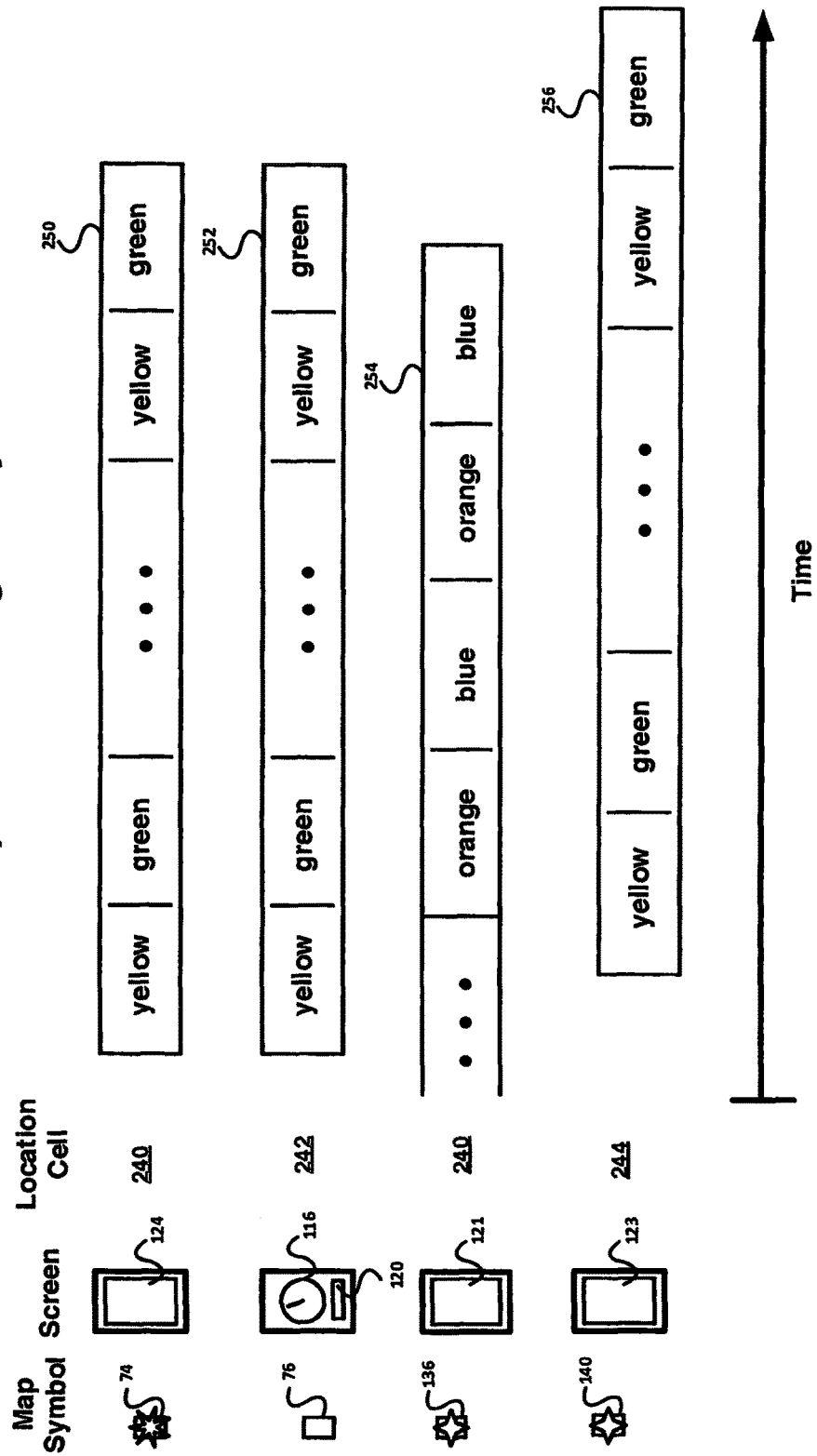
FIG. 12 illustrates some beaconing sequences that could be used in location cells.

FIGS. 11-12 illustrate assigning beaconing sequences in a location cell that would be useful in a crowded environment such as Times Square. Let's assume the second user 128 is at the corner of W. 47th Street and Broadway looking for the first user 126 who is at W. 46th Street and 7th Avenue at about 10 PM on December 31st, just before the New Year celebration. A third user 134 is at 46th and Broadway and a fourth user 138 at W. 49th Street and Broadway. The third user 134 and fourth user 138 are using the application, but are not in the same group as defined by the first user 126 which included only the second user 128. The third user 134 with a mobile device 136 is assigned an orange-blue beaconing sequence 254. Since the first user 126 and the third user 134 are in the same location cell 240, to avoid a conflict the first server 10 assigns a different beaconing sequence such the yellow-green sequence 250 to be displayed on the first mobile device 74 of the first user 126. In contrast, the fourth user 138 with mobile device 140 in a non-adjacent cell such as location cell 244 can be assigned a similar yellow-green beaconing sequence 256. The first server 10 can extend the assignment of the unique beaconing sequences for each location cell beyond the location cell 240 of the first user 126 and the location cell 242 of the second user 128 to one or more surrounding location cells such as cell location 246, which is non-adjacent to location cell 240. FIG. 11 illustrates the location cells as hexagonal, but it could be a variety of geometric planar shapes such as a square, a rectangular, circle, or a triangle, or any shape that can be arranged in a grid or a geometric 3D shapes such as a cube, a cylinder, or a prism.

Figure 13:
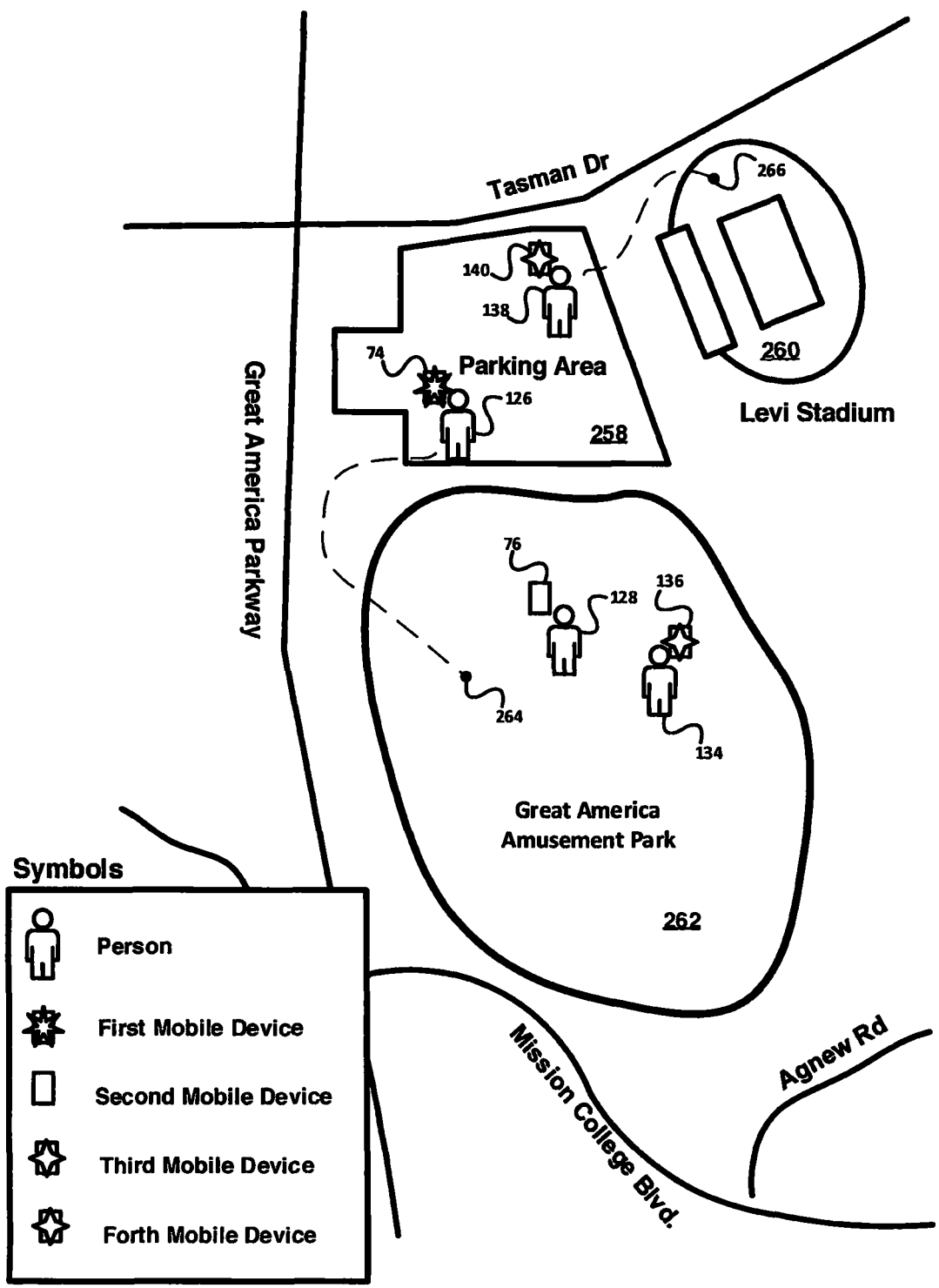
FIG. 13 illustrates assigning beaconing sequences by venue.
Figure 14:
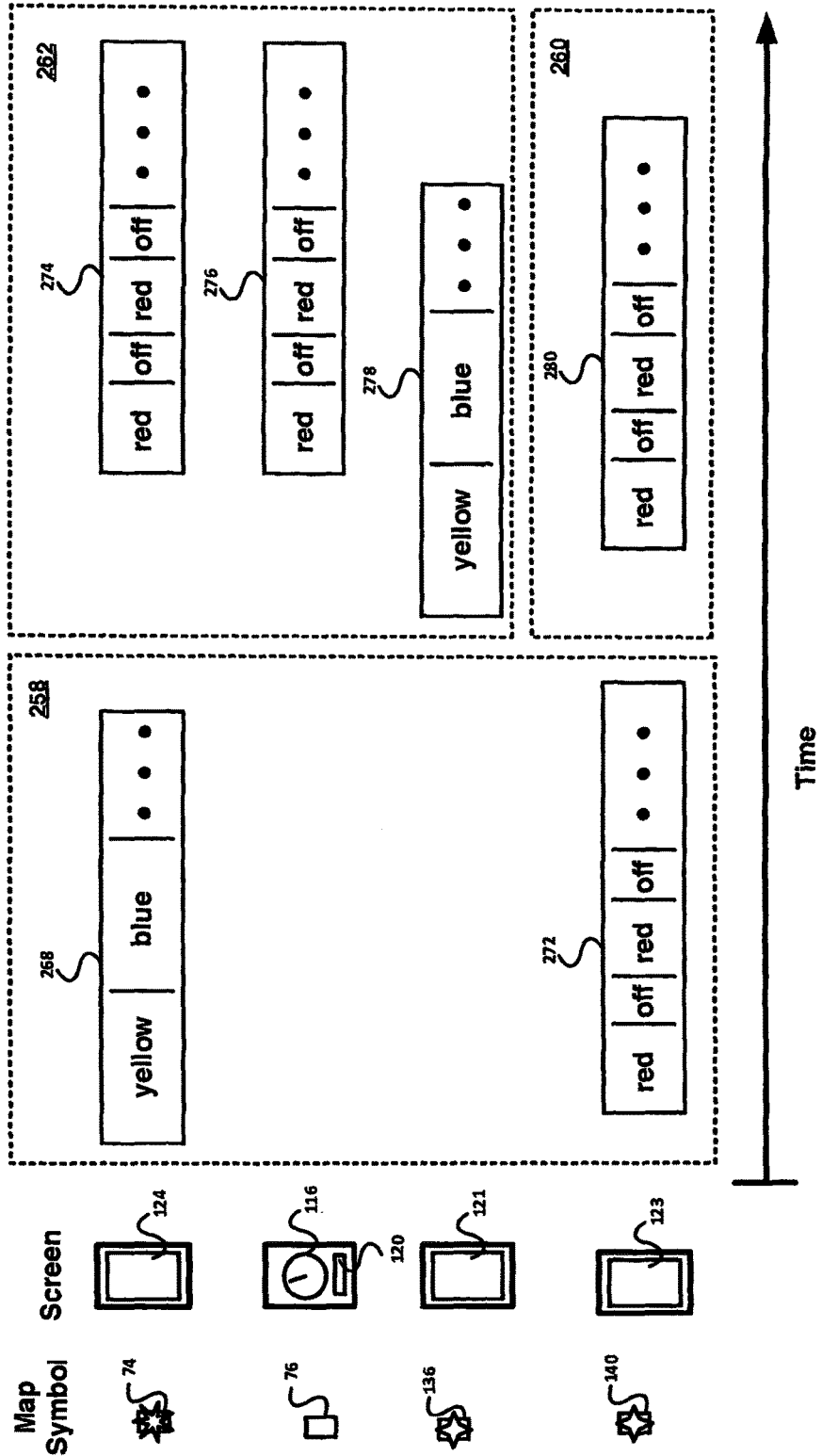
FIG. 14 illustrates examples of beaconing sequences that could be used in FIG. 13.

FIGS. 13-14 illustrate assigning beaconing sequences by venue that would be useful in adjacent venues such as an amusement park, a stadium and a shared parking lot. Initially, the first user 126 with a mobile device 74 and the fourth user 138 with a mobile device 140 are both in the first venue 258 (e.g., the shared parking lot). In the first venue 258, the first server 10 has assigned a yellow blue beaconing sequence 268 to the first mobile device 74, and the flashing red beaconing sequence 272 to the fourth mobile device 140. The first and fourth users 126, 138 are both using the application, but are not in the same group. Next, the fourth user 138 travels to a location 266 in a second venue 260 (e.g., a sports stadium). Since no other user is assigned the flashing red beaconing sequence 272 in the second venue 260, the fourth user 138 can continue using it. In contrast, when the first user 126 travels to a location 264 in a third venue 262 (e.g., an amusement park), the first server 10 will assign the flashing red beaconing sequence 274 to the first mobile device 74 to avoid a conflict with the third user 134 whose mobile device 136 was previously assigned the yellow blue beaconing sequence 278 in the third venue 262.

Now the second user 128 can readily find the first user 126 using the same flashing read beaconing sequence 274 and 276.

FIG. 15 illustrates a flow diagram for the beaconing logic that runs on the server of FIGS. 1 and 3. Hunter et al., *Java Servlet Programming* (2001) describes Java Servlet programming that can be used to implement the beaconing logic and is incorporated by reference herein. As shown in FIG. 15, the beacon logic 32 (FIG. 1) that runs in the first server 10 begins when the second user 128 presses the wave request button 118 on the screen 114 of the second mobile device 76 (FIG. 2E). The second mobile device 76 will send a request (e.g., HTTP request) to the first server 10. At step 164, the first server 10 will read the request, which includes the clock value of the second mobile device 76. At step 168, the first server 10 will read the location of the first and second mobile devices 74, 76. The first server 10 will perform a time sync that reads its own clock and receives the time stamp of each of the first and second mobile devices 74, 76. As a reminder, the first mobile device 74 also performs a time sync (e.g., FIG. 3, Start of App 125) that includes a clock value of the first mobile device 74. In an embodiment, the time sync can be performed multiple times and averaged. The time sync may be done once or periodically, and will depend on accuracy of the mobile device clocks, and clock drift. Any difference between the clocks is stored in a memory accessible to the first server 10, and represents an offset that can be used to ensure the beaconing sequence of the first mobile device 74 and the second mobile device 76 are on the same clock. At step 170, the first server 10 will look up the beaconing sequence history table, which is stored in the database 24. Each record in the table will contain: beaconing sequence, the geographic location, and the time of the sequence. At step 172, the beacon logic 32 will execute a database query that filters on location and time so that only recent beaconing sequences from other users in the area will be in the result. If there are no recent beaconing sequences used by other users in the area, the beacon logic 32 will move to step 174. At step 174, the beacon logic 32 will perform a lookup of the first user's preference for a beaconing sequence. At step 176, the beacon logic 32 will calculate the beaconing sequence from the preference of the first user 74.

If there are recent beaconing sequences used by other users in the area at step 172, the beacon logic 32 will move to step 178. At step 178, the beacon logic 32 will read the record of the beacon sequence in the beaconing sequence history table that was recently used in the area. At step 180, the beacon logic 32 will add the beacon sequence to a sequence list that contains all the beacon sequences that cannot be used in the area by the first user 126. At step 182, the beacon logic 32 will determine if there is another record returned from the query of the database 24. If yes, the beacon logic 32 will return to read the next beacon history record. This loop continues until all of the beacon sequence records are processed. If no, the beacon logic 32 will go to step 184. At step 184, the beacon logic 32 will calculate the beacon sequence that will be used by the first user 126. In an embodiment, this calculation can optimize the difference between the color(s) in the beaconing sequence to be used by the first user 126 and those already in use. At step 186, the beacon logic 32 adds the calculated beacon sequence to the beacon history table. At step 188, the beacon logic 32 sends a response with the calculated beacon sequence 126, which is received by the first mobile device 74 at step 120 (FIG. 3).

Figure 16:
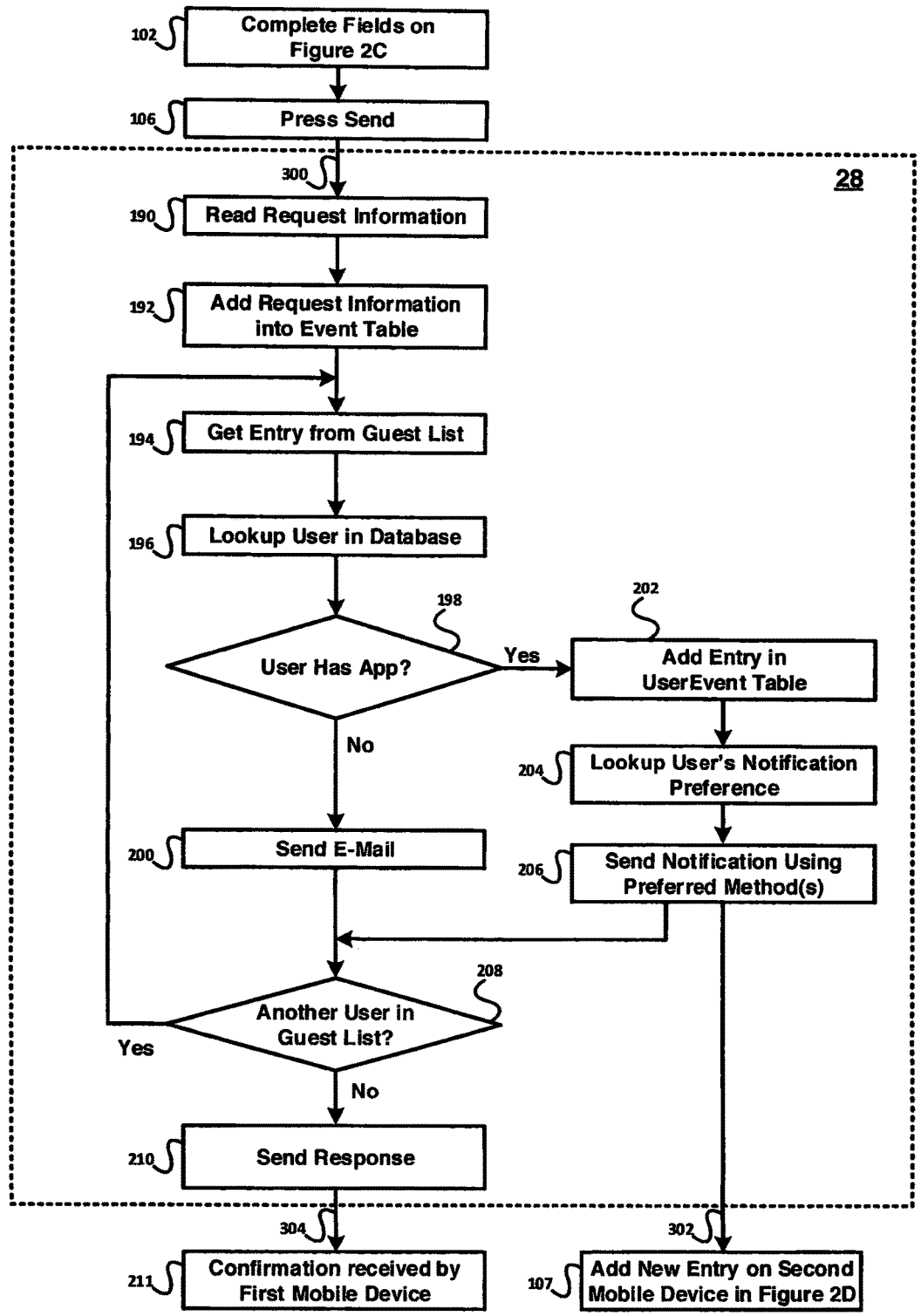
FIG. 16 illustrates a flow diagram for the message logic that runs on the server of FIGS. 1 and 3.

FIG. 16 illustrates a flow diagram for the message logic that runs in the server of FIGS. 1 and 3. The first user 74 will complete the fields shown in FIG. 2C. As shown in FIG. 2C, the screen 102 displays the fields: an event name 101, a start time 103, an end time 105, and a list of guests 104. In an embodiment, the list of guests 104 is the email addresses of the guests.

Referring to FIG. 16, at step 106, the first user 126 presses the send button 106 (FIG. 2C), which causes the first mobile device 74 to send a request 300 to the first server 10. The request 300 includes the information that the user input into one or more of the fields shown in FIG. 2C. The message logic 28 reads the request at step 190. At step 192, the message logic 28 adds the request information as an entry into the Event table in the database 24. At step 194, the message logic 28 will read the identifying information (e.g., email address or cell phone number) of the next guest in the list 104 (FIG. 2C). At step 196, the message logic 28 will perform a lookup in the user in the database 24. At step 198, the message logic 28 will check if the user has the application. If yes, the message logic 28 will add an entry in the user event table at step 202. Next, at step 204, the message logic 28 will perform a lookup of the user's notification preferences (e.g., email, text message, push notification, automated phone call, or a social media post). At step 206, the message logic 28 will send a notification using the preferred method(s) to the second mobile device 76. In addition, the message logic 28 will send a message to add an entry 107 to the find things screen 108 (FIG. 2D) of the second mobile device 76. Next, at step 208, the message logic 28 will check if another user is on the guest list. If yes, the message logic 28 will return to step 194. If not, that is, it was the last user on the guest list, the message logic 28 will send a response 304 (FIG. 3) to the first mobile device 74 at step 210. As a result, a confirmation is received by the first mobile device 74 at step 211.

Figure 17:
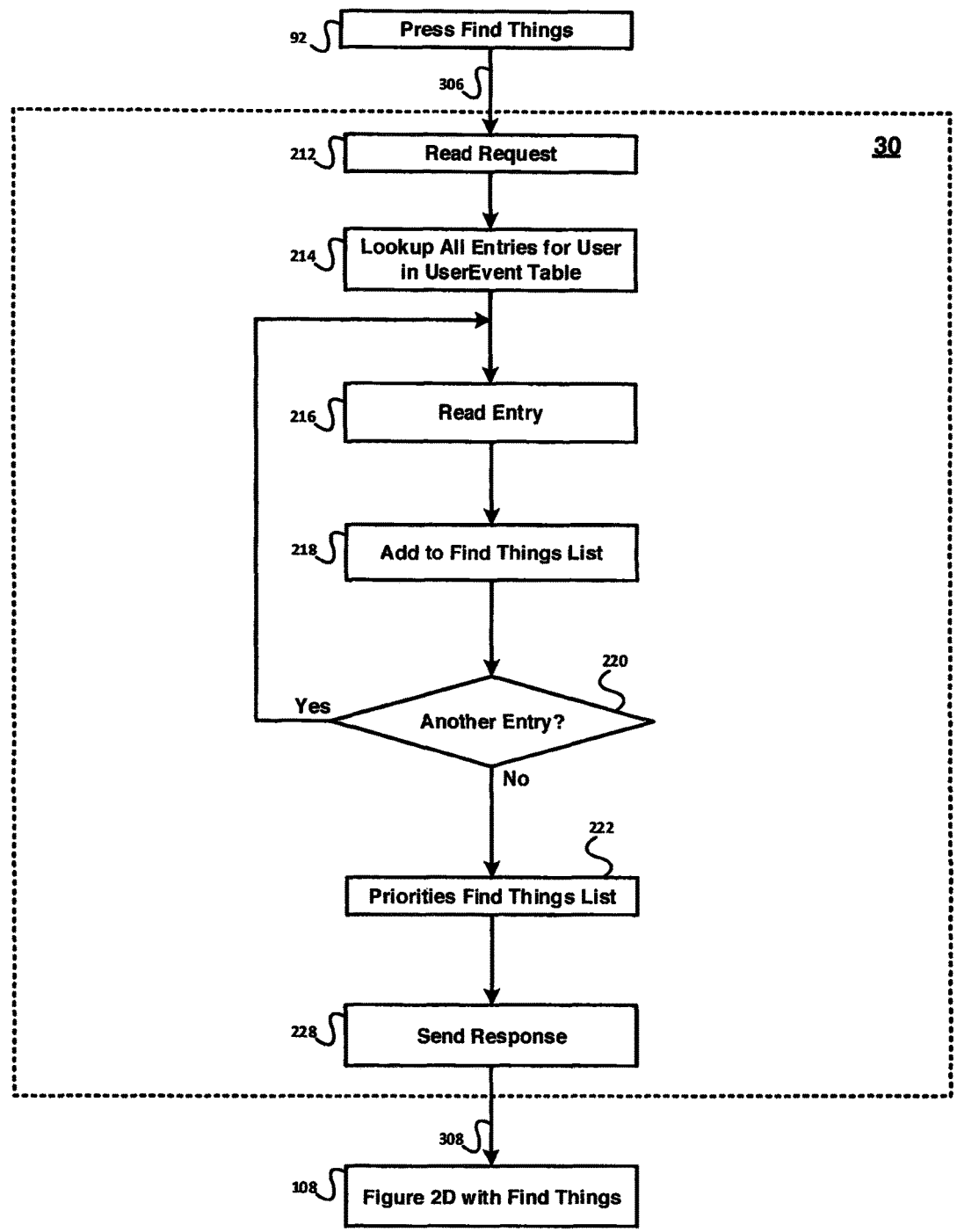
FIG. 17 illustrates a flow diagram for the event logic that runs on the server of FIGS. 1 and 3.

FIG. 17 illustrates a flow diagram for the event logic that runs on the server of FIGS. 1 and 3. At step 92, the second user 128 will press the find things button 92 (FIG. 2A) on the second mobile device 76, which sends a request 306 to complete the find things screen to the first server 10. At step 212, the first server 10 reads the request that includes the identity of the second user 128. At step 214, the event logic 30 will perform a lookup of all entries for the second user 128 in the user event table in the database 24. The event logic 30 will read each entry from the user event table at step 216. At step 218, the event logic 30 will add the information from the entry to the find things list that will eventually be returned to the second mobile device 76 to create the find things screen 108 in FIG. 2D. At step 220, the event logic 30 will read if another entry exists in the user event table. If yes, the event logic 30 will return to step 216. If no, the event logic 30 will go to step 222. The event logic 30 will prioritize the find things list at step 222 then send it in a response 308 (FIG. 3) at step 228 to generate the screen 108 (FIG. 2D) with entries pertaining to the second user 128 on the second mobile device 76.

FIG. 18A-18F is a set of flow diagrams that illustrate the application logic that runs on the mobile device.

Figure 18A:
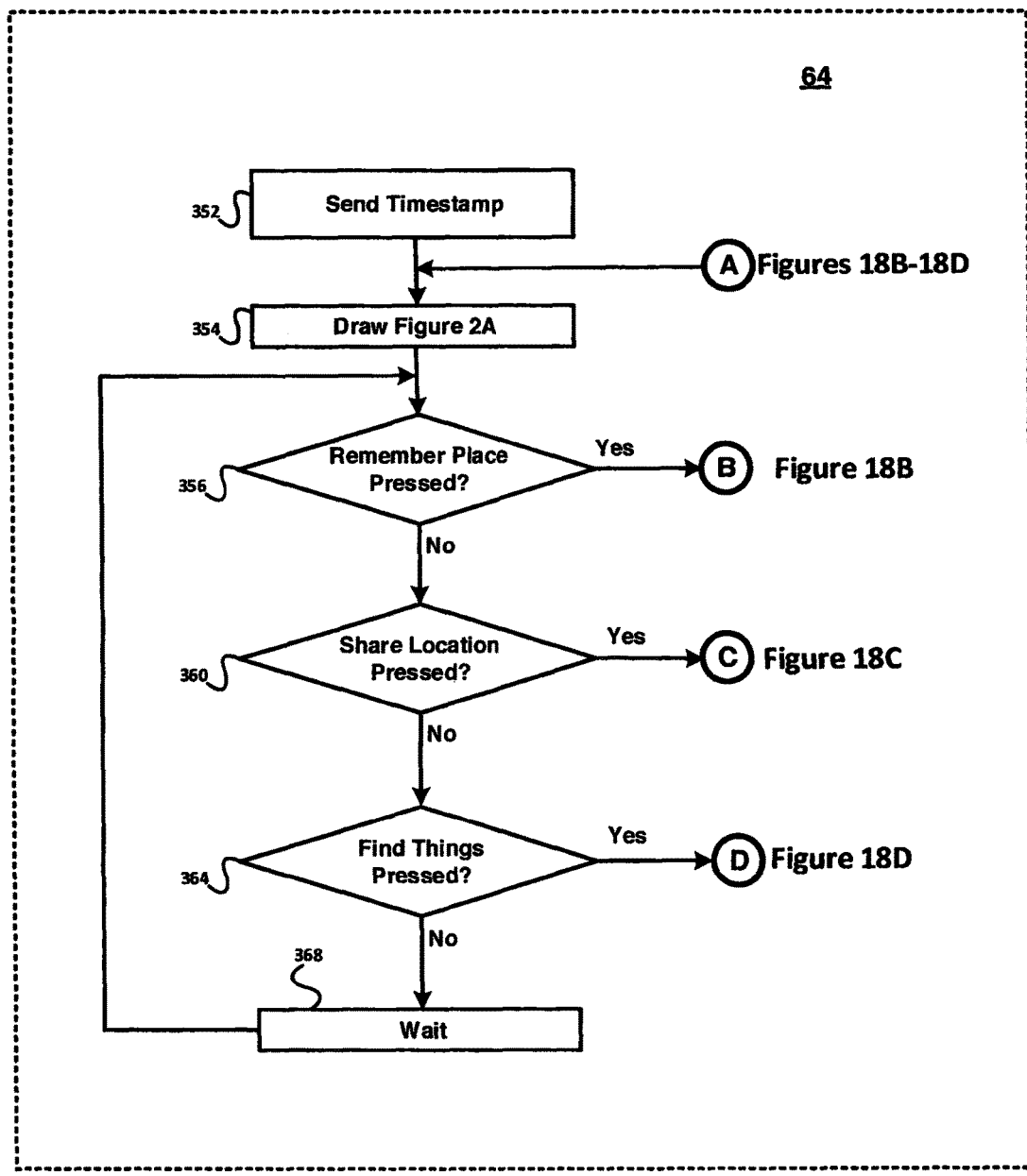
FIG. 18A-18F is a set of flow diagrams that illustrate the application logic that runs on the mobile device and interacts with the server.

FIG. 18A illustrates the application that runs on the mobile device. The application 64 includes communication interface 66, the application logic 68, and the user interface 70. At step 352, the application logic 68 will use the communication interface 66 to send a time stamp as described in FIG. 3. At step 354, the application logic 68 uses the user interface 70 to draw the screen 88 shown in FIG. 2A. At step 356, the application logic 68 determines if the user pressed the remember place button 89 shown in FIG. 2A. If yes, the application logic 68 exits to entry point B on FIG. 18B. If no, the application logic 68 goes to step 360. At step 360, the application logic 68 determines if the user pressed the share location button 90 shown in FIG. 2A. If yes, the application logic 68 exits to entry point C on FIG. 18C. If not, the application logic 68 goes to step 364. At step 364, the application logic 68 determines if the user pressed the find things button 92 shown in FIG. 2A. If yes, the application logic 68 exits to entry point D on FIG. 18D. If no, the application logic 68 goes to step 368. At step 368, the application logic 68 waits a time period (e.g., 10 ms) then goes to step 356.

Figure 18B:
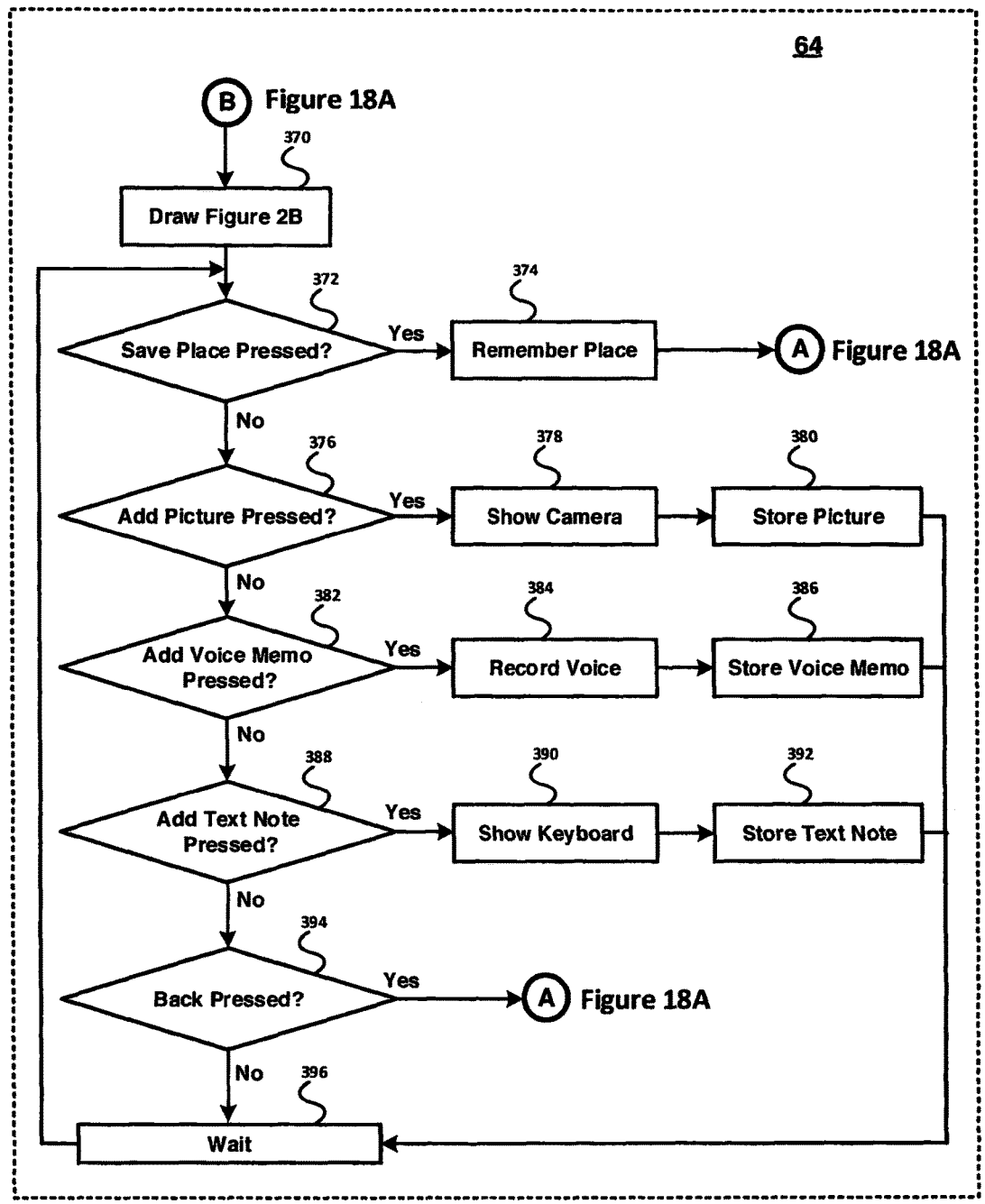

FIG. 18B illustrates the application that runs on the mobile device. At step 370, the application logic 68 uses the user interface 70 to draw the screen 94 shown in FIG. 2B. At step 372, the application logic 68 determines if the user pressed the save place button 98 shown in FIG. 2B. If yes, the application logic 68 goes to the remember place at step 374. At step 374, the application logic 68 stores the current location in the memory of the mobile device and optionally sends the location information to be stored on the first server 10 and preferably the database 24. The application logic 68 exits to entry point A on FIG. 18A. At step 376, the application logic 68 determines if the user pressed the add picture button 95 shown in FIG. 2B. If yes, the application logic 68 will show the camera at step 378. At step 380, the application logic 68 stores the picture (e.g., a landmark near the place to be remembered) in the memory of the mobile device and optionally sends the picture to be stored on the first server 10 and preferably the database 24. At step 382, the application logic 68 determines if the user pressed the add memo button 97 shown in FIG. 2B. If yes, the application logic 68 goes to record voice feature at step 384. At step 386, the application logic 68 stores the voice memo (e.g., a description about the place to be remembered) in the memory of the mobile device and optionally sends the recorded voice memo to be stored on the first server 10 and preferably the storage 24. At step 388, the application logic 68 determines if the user pressed the add text note button 99 shown in FIG. 2B. If yes, the application logic 68 uses the user interface 70 to show a keyboard at step 390. At step 392, the application logic 68 stores the text note (e.g., a text note about the place to be remembered) in the memory of the mobile device and optionally sends the text note to be stored on the first server 10 and preferably the database 24. If the user did not press buttons 95, 97, 98, or 99, the application logic 68 will determine if the user pressed the back button 100 as shown in FIG. 2B at step 394. If not, application logic 68 waits a time period (e.g., 10 ms) at step 396. After steps 380, 386, and 392, the application logic 68 waits at step 396.

Figure 18C:
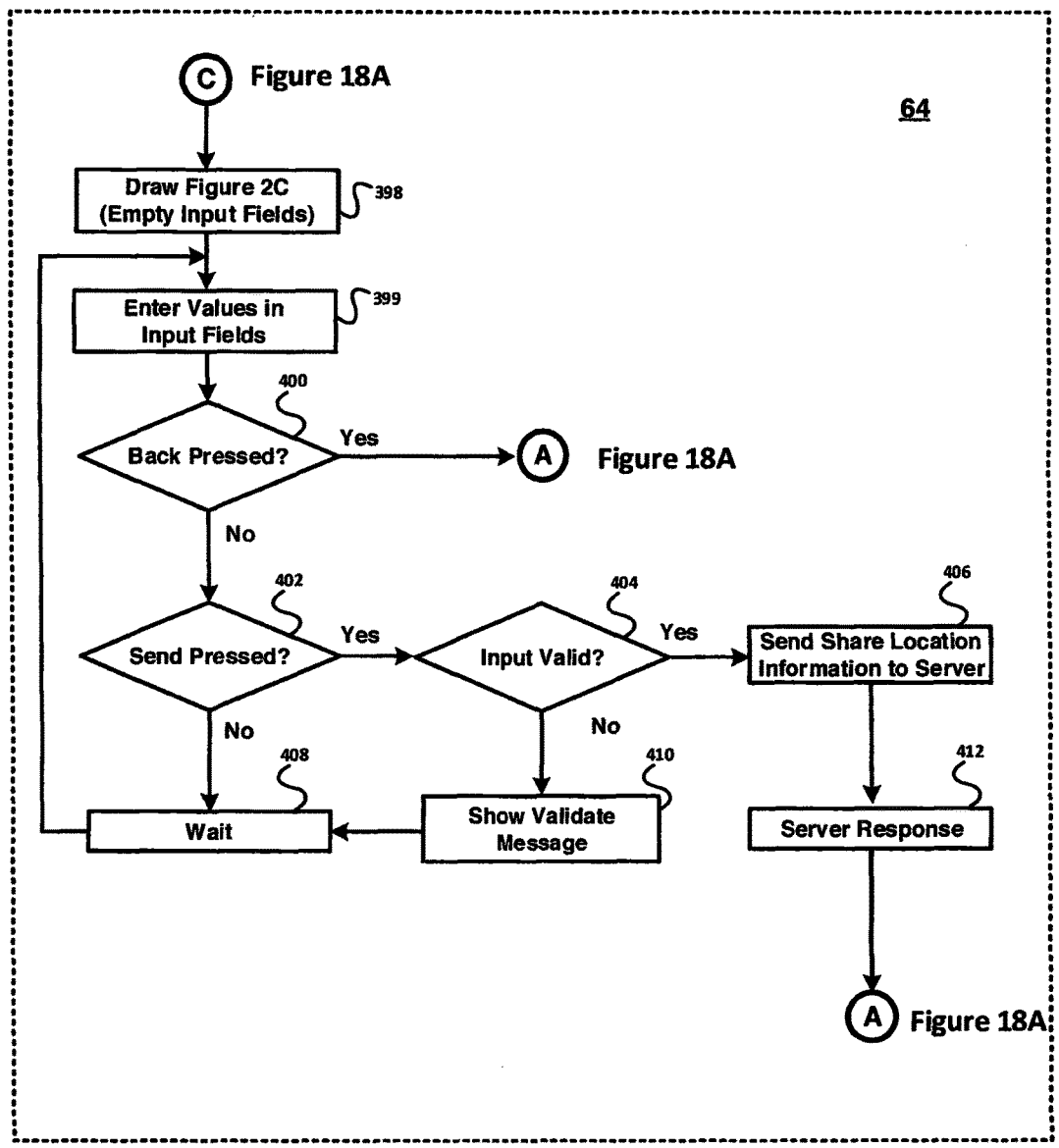

FIG. 18C illustrates another feature of the application that runs on the mobile device. FIG. 18C begins by entering from point C on FIG. 18A. At step 398, the application logic 68 uses the user interface 70 to draw the share location screen 102 shown in FIG. 2C. The input fields of share location screen 102 are initially empty (not shown). At step 399, the user will enter values into the input fields as previously shown in FIG. 2C. At step 400, if the user presses the back button 100 (FIG. 2C), the application logic 68 will go to entry point A on FIG. 18A to draw the home screen 88 shown in FIG. 2A. If not, the application logic 68 will determine if the user pressed the send button 106 as shown in FIG. 2C. If not, the application logic 68 waits a time period (e.g., 10 ms) at step 408. If yes, the application logic 68 will determine if the user input is valid at step 404. If not, the application logic 68 will notify the user that the input is not valid at step 410. If yes, the application logic 68 will send share location information to be stored on the first server 10 and preferably on the database 24 at step 406. At step 412, the server will send a response to the mobile device then the application logic 68 exits to entry point A on FIG. 18A.

Figure 18D:
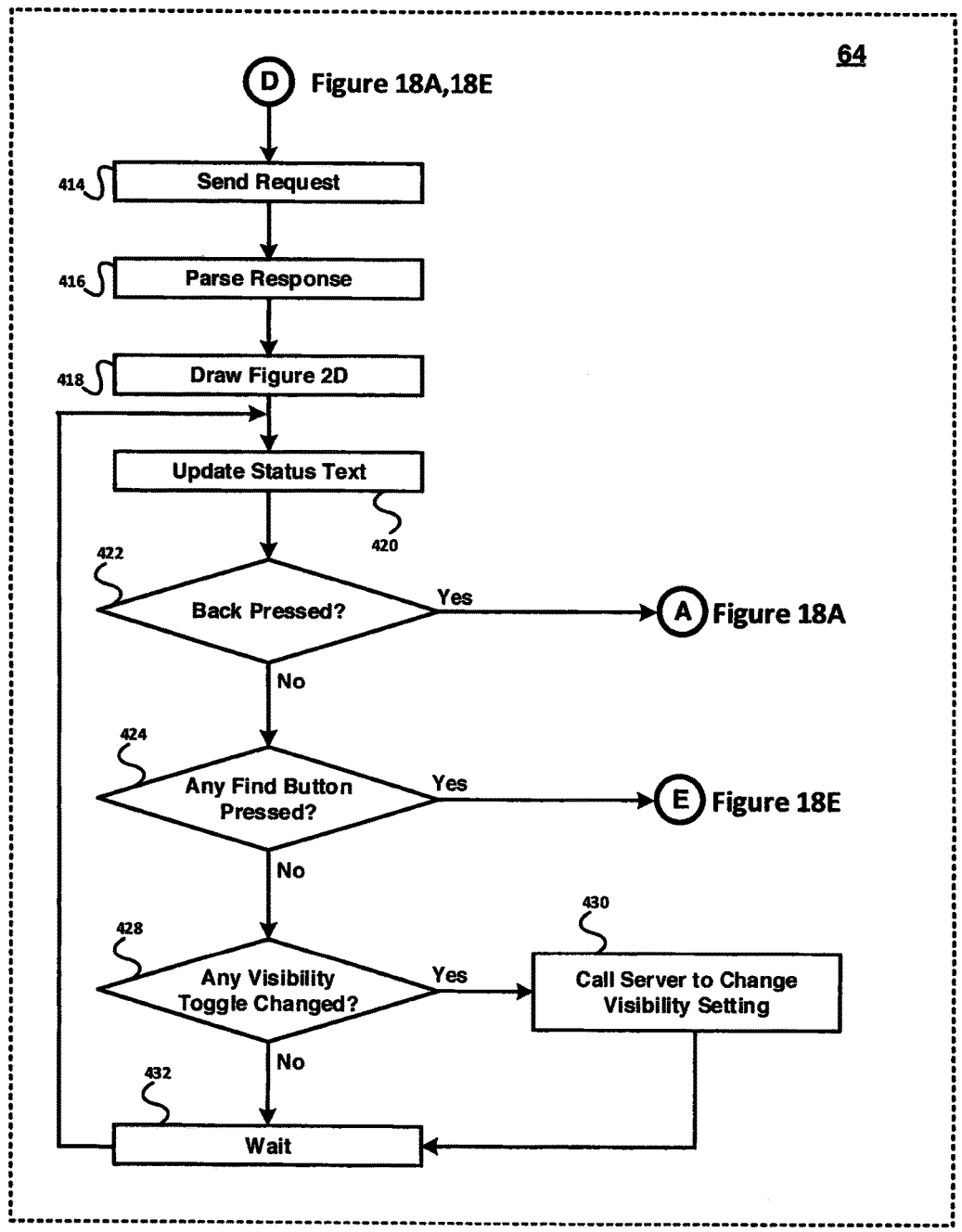

FIG. 18D illustrates another feature of the application that runs on the mobile device. FIG. 18D begins by entering from point D on FIG. 18A or FIG. 18E. At step 414, the application logic 68 will send a request with the identity of the user to the first server 10 (FIG. 1). The event logic 30 will use the user identity to look up all of the entries of that user in the user event table then prepare a find things list which will be returned in a response to the user's mobile device. The application logic 68 of the mobile device will parse the response at step 416. At step 418, the application logic 68 will draw the find things screen 108 in FIG. 2D. At step 420, the application logic 68 will update the status text in each entry of the find things screen 108. Referring to screen 108 on FIG. 2D, the entry 107 (e.g., Alan @ Concert) the status text is "200 feet NW." In contrast, the "Alan @ Concert" will not change and thus will not be updated. If not, at step 424, the application logic 68 determines if the second user 128 pressed any of the find buttons such as button 110, 112, 117, or 119 as shown in FIG. 2D. If yes, the application logic 68 will go to entry point E on FIG. 18E. If not, the application logic 68 goes to step 428 to determine if the second user 128 switched any visibility button on or off (FIG. 2D, button 111 is on, and button 113 is off). When the visibility switch 111 is "on" the second user 128 (e.g., Bob) is visible to the first user 126 (e.g., Alan) and if the switch 111 is "off" the second user 128 is not visible. The visibility switch could be referred to as a toggle button. At step 430, the application logic 68 uses communication interface 66 to call the first server 10 to change the visibility settings for the second user 128 in database 24. At step 432, the application logic 68 will wait for a time period (e.g., 10 ms) then proceed to step 420.

Figure 18E:
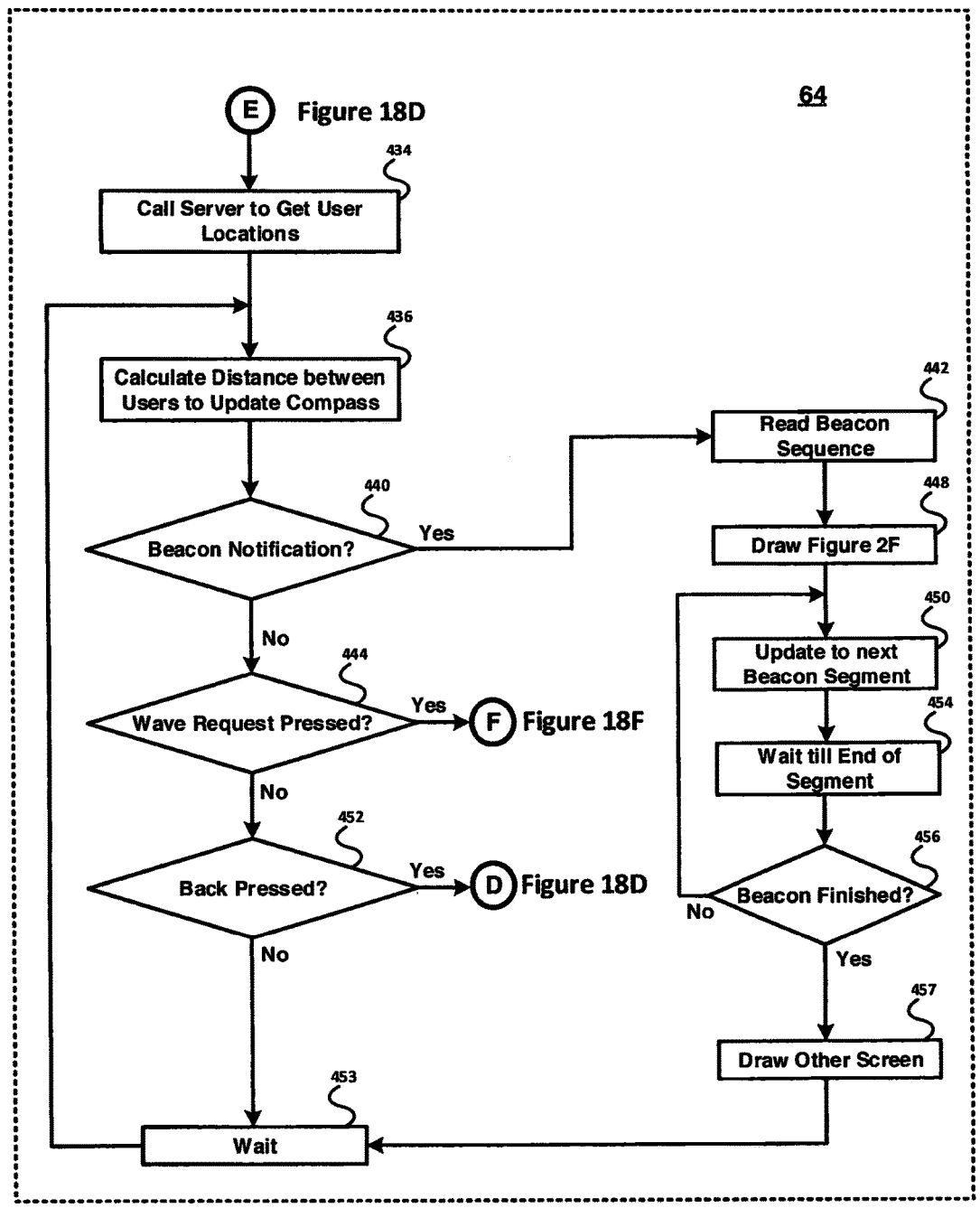

FIG. 18E illustrates another feature of the application that runs on the mobile device. FIG. 18E begins by entering from point E on FIG. 18D. At step 434, the application logic 68 uses the communication interface 66 to call the first server 10 to get user locations. At step 436, the application logic 68 calculates the distance between users and updates the compass 116 on the screen 114 shown in FIG. 2E. At step 440, the application logic 68 will determine if there is a beacon notification on the first mobile device 74. If yes, the application logic 68 will read a beacon sequence at step 442, and at step 448 draw the screen 122 shown in FIG. 2F. At step 450, the application logic 68 updates a segment of the beaconing sequence, then waits until the end of the segment at step 454 then determines if the beaconing sequence is finished at step 456. If not, the application logic 68 will repeat the loop beginning at step 450. If the beaconing sequence is finished, the application logic 68 will draw another screen (e.g., FIG. 2A, 2D, or 2E or a message screen (e.g., text or voice) to allow the first user 126 to communicate and assist in finding the second user 128 at step 457. At step 453, the application logic 68 will wait for a time period (e.g., 10 ms) then proceed to step 436.

Figure 18F:
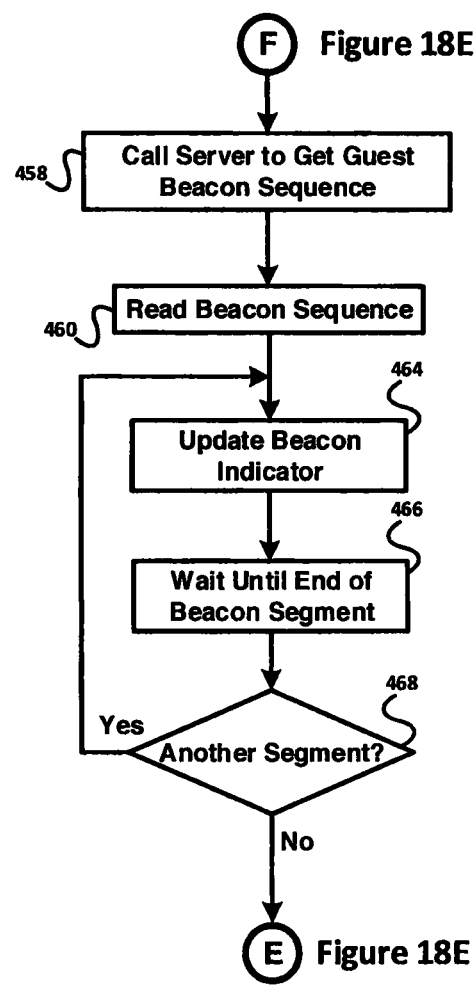

FIG. 18F illustrates an embodiment of the application that runs on the mobile device. FIG. 18F begins by entering from point F on FIG. 18E. At step 458, the application logic 68 uses the communication interface 66 to call the first server 10 to get the beacon sequence for the beacon indicator 120 on the screen 114 as shown in FIG. 2E. At step 460, the application logic 68 reads the beacon sequence and updates the beacon indicator 120 (FIG. 2E) at step 464. At step 466, the application logic 68 will wait until the end of the current segment of the beacon sequence then proceeds to step 468. At step 468, the application logic 68 will determine if it is the last segment of the beacon sequence, that is, the beacon sequence is finished. If yes, the application logic 68 will exit to entry point E on FIG. 18E.

What is claimed:

1. A method implemented in a server for providing a unique beaconing sequence to an electronic wearable and a mobile device in a geographic area so a user of the electronic wearable and a user of the mobile device can locate each other, comprising:
   receiving a request from the mobile device;
   reading the request;
   reading a beacon history table in response to the request read;
   in response to the reading, determining if there are beacon sequences used in the geographic area;
   in response to the determining, calculating a unique beacon sequence not used in the geographic area;
   adding the unique beacon sequence to the beacon history table; and
   sending the unique beacon sequence for display on the electronic wearable and the mobile device, wherein the displayed unique beacon sequence is conspicuous and can be seen by the user of the electronic wearable and the user of the mobile device in the geographic area so that the user of the electronic wearable and the user of the mobile device can locate each other.

2. The method of claim 1, wherein the unique beacon sequence for display on the electronic wearable is visibly different from the other beacon sequences used in the geographic area.

3. The method of claim 1, further comprising updating coordinates for a compass on the mobile device that indicates the location of the electronic wearable.

4. The method of claim 3, wherein the mobile device is a smart watch.

5. The method of claim 1, further comprising computing an offset for displaying the unique beacon sequence at that same time on the electronic wearable and the mobile device.

6. The method of claim 1, further comprising using venue or cell location to determine the geographic area.

7. A method implemented in a server for providing a unique beaconing sequence to an electronic wearable and a mobile device in a geographic area so a user of the electronic wearable and a user of the mobile device can locate each other, comprising:
   receiving a request from the electronic wearable;
   reading the request;
   reading a beacon history table in response to the request read;
   in response to the reading, determining if there are beacon sequences used in the geographic area;
   in response to the determining, calculating a unique beacon sequence not used in the geographic area;
   adding the unique beacon sequence to the beacon history table; and
   sending the unique beacon sequence for display on the electronic wearable and the mobile device, wherein the displayed unique beacon sequence is conspicuous and can be seen by the user of the mobile device and the user of the electronic wearable in the geographic area so that the user of the electronic wearable and the user of the mobile device can locate each other.

8. The method of claim 7, wherein the unique beacon sequence for display on the electronic wearable is visibly different from the other beacon sequences used in the geographic area.

9. The method of claim 7, further comprising updating coordinates for a compass on the electronic wearable that indicates the location of the mobile device.

10. The method of claim 9, wherein the mobile device is a smart watch.

11. The method of claim 7, further comprising computing an offset for displaying the unique beacon sequence at that same time on the electronic wearable and the mobile device.

12. The method of claim 7, further comprising using venue or cell location to determine the geographic area.

13. A method implemented in a server for providing a unique beaconing sequence to a first electronic wearable and a second electronic wearable in a geographic area so a first user of the electronic wearable and a second user of the second electronic wearable can locate each other, comprising:
   receiving a request from the first electronic wearable;
   reading the request;
   reading a beacon history table in response to the request read;
   in response to the reading, determining if there are beacon sequences used in the geographic area;
   in response to the determining, calculating a unique beacon sequence not used in the geographic area;
   adding the unique beacon sequence to the beacon history table; and
   sending the unique beacon sequence for display on the first electronic wearable and the second electronic wearable, wherein the displayed unique beacon sequence is conspicuous and can be seen by the first user and the second user in the geographic area so that the first user of the first electronic wearable and the second user of the second electronic wearable can locate each other.

14. The method of claim 13, wherein the unique beacon sequence for display on the first and second electronic wearables is visibly different from the other beacon sequences used in the geographic area.

15. The method of claim 13, further comprising updating coordinates for a compass on the second electronic wearable that indicates the location of the first electronic wearable.

16. The method of claim 13, further comprising computing an offset for displaying the unique beacon sequence at that same time on the first electronic wearable and the second electronic wearable.

17. The method of claim 13, further comprising using venue or cell location to determine the geographic area.

18. The method of claim 13, wherein the first and second electronic wearables are smart watches.

* * * * *